(12) United States Patent  
Llambes et al.

(10) Patent No.: US 8,588,875 B2  
(45) Date of Patent: Nov. 19, 2013

(54) SUPERCONDUCTING FAULT CURRENT-LIMITER WITH VARIABLE SHUNT IMPEDANCE

(75) Inventors: Juan Carlos H. Llambes, Schenectady, NY (US); Xuming Xiong, Sugar Land, TX (US)

(73) Assignee: Superpower, Inc., Schenectady, NY (US)

( * ) Notice: Subject to any disclaimer, the term of this patent is extended or adjusted under 35 U.S.C. 154(b) by 804 days.

(21) Appl. No.: 12/691,325

(22) Filed: Jan. 21, 2010

(65) Prior Publication Data

US 2011/0177953 A1 Jul. 21, 2011

(51) Int. Cl.
*H01L 39/00* (2006.01)
(52) U.S. Cl.
USPC ........ 505/150; 174/15.3; 174/15.4; 174/15.5; 361/19
(58) Field of Classification Search
USPC ........... 505/150; 174/15.3, 15.4, 15.5; 361/19
See application file for complete search history.

(56) References Cited

U.S. PATENT DOCUMENTS

| | | | |
|---|---|---|---|
| 3,883,836 A | 5/1975 | Ward, Jr. et al. | |
| 5,617,280 A * | 4/1997 | Hara et al. | 361/19 |
| 5,694,279 A * | 12/1997 | Mumford | 361/19 |
| 6,664,875 B2 | 12/2003 | Yuan et al. | |
| 6,809,910 B1 | 10/2004 | Yuan et al. | |
| 6,947,265 B2 | 9/2005 | Mine et al. | |
| 6,958,893 B2 | 10/2005 | Yuan | |
| 7,283,339 B2 | 10/2007 | Tekletsadik | |
| 7,333,309 B2 | 2/2008 | Tekletsadik | |
| 7,359,164 B2 | 4/2008 | Yuan | |
| 7,375,933 B2 | 5/2008 | Tekletsadik | |
| 7,440,244 B2 | 10/2008 | Yuan et al. | |
| 2003/0021074 A1 * | 1/2003 | Yuan et al. | 361/117 |
| 2008/0043382 A1 * | 2/2008 | Lee et al. | 361/19 |

FOREIGN PATENT DOCUMENTS

| | | |
|---|---|---|
| GB | 2 439 764 A | 1/2008 |
| WO | WO 95/24005 A1 | 9/1995 |
| WO | 2008/125022 A1 | 10/2008 |
| WO | WO 2011/091256 A2 | 7/2011 |

OTHER PUBLICATIONS

"Notification of the International Search Report and the Written Opinion of the International Searching Authority", PCT Application No. PCT/US2011/022063 (PCT Publication No. WO 2011/091256 A2), dated Oct. 20, 2011.

Noe et al., "Supraleitende Strombegrenzer in der Energietechnik", Elektrie, Veb Verlag Technik, Berlin, vol. 1, No. 11/12, pp. 414-424 (Jan. 1, 1997) (German document).

* cited by examiner

*Primary Examiner* — Paul Wartalowicz
(74) *Attorney, Agent, or Firm* — Kevin P. Radigan, Esq.; Heslin Rothenberg Farley & Mesiti P.C.

(57) ABSTRACT

A superconducting fault current-limiter is provided, including a superconducting element configured to resistively or inductively limit a fault current, and one or more variable-impedance shunts electrically coupled in parallel with the superconducting element. The variable-impedance shunt(s) is configured to present a first impedance during a superconducting state of the superconducting element and a second impedance during a normal resistive state of the superconducting element. The superconducting element transitions from the superconducting state to the normal resistive state responsive to the fault current, and responsive thereto, the variable-impedance shunt(s) transitions from the first to the second impedance. The second impedance of the variable-impedance shunt(s) is a lower impedance than the first impedance, which facilitates current flow through the variable-impedance shunt(s) during a recovery transition of the superconducting element from the normal resistive state to the superconducting state, and thus, facilitates recovery of the superconducting element under load.

11 Claims, 14 Drawing Sheets

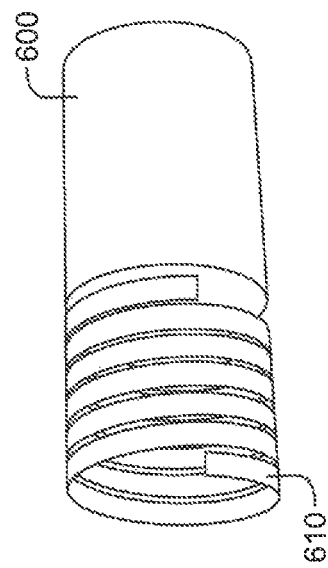
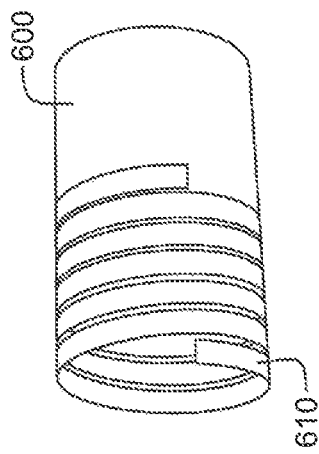
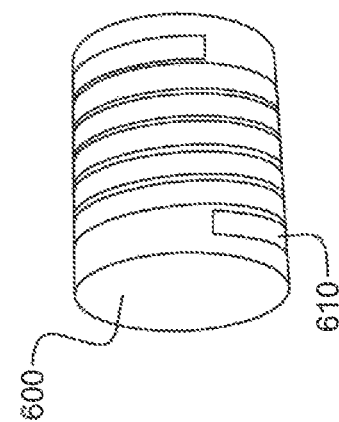

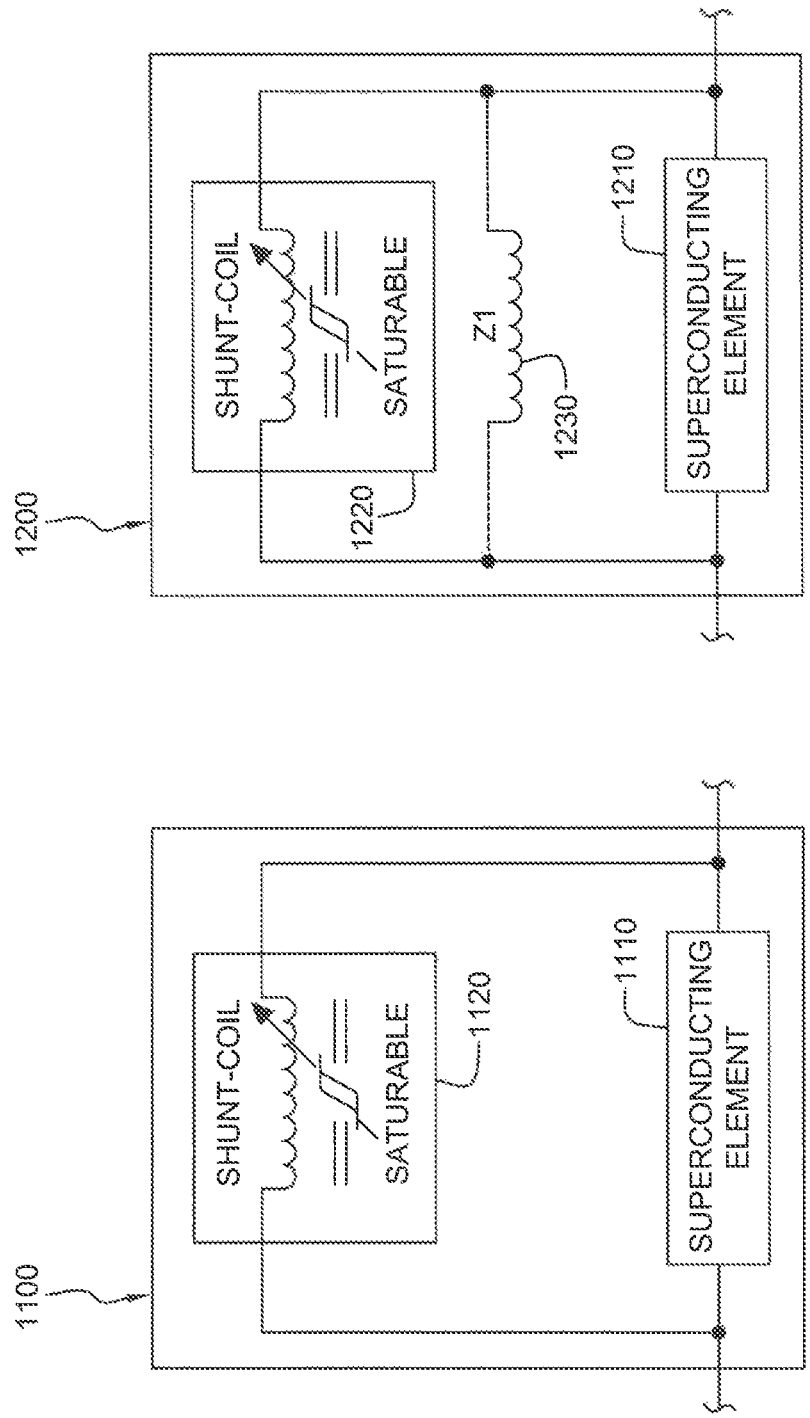

SUPERCONDUCTING FAULT CURRENT-LIMITER WITH VARIABLE SHUNT IMPEDANCE

STATEMENT REGARDING FEDERALLY SPONSORED RESEARCH

This invention was made, in part, with Government support under Contract Number DE-F36-03G013033, awarded by the Department of Energy. Accordingly, the United States Government may have certain rights in the invention.

TECHNICAL FIELD

The present invention relates in general to a current-limiter, and more particularly, to a superconducting fault current-limiter with a variable shunt impedance connected in parallel with a superconducting element to facilitate recovery of the superconducting element under load.

BACKGROUND OF THE INVENTION

Current-limiting devices are critical in electric power transmission and distribution systems. For various reasons, such as a lightning strike, a short circuit condition can develop in a section of a power grid causing a sharp surge in current. If this surge of current, which is often referred to as fault current, exceeds the protective capabilities of the switchgear equipment deployed throughout the grid system, it could cause catastrophic damage to the grid equipment and the customer loads that are connected to the system.

Superconductors, especially high-temperature superconducting (HTS) materials, are well suited for use in a current-limiting device because of their intrinsic properties that can be manipulated to achieve the effect of "variable-impedance" under certain operating conditions. A superconductor, when operated within a certain temperature and external magnetic field range (i.e., the "critical temperature" ($T_c$) and "critical magnetic field ($H_c$) range), exhibits no electrical resistance if the current flowing through it is below a certain threshold (i.e., the "critical current level" ($I_c$)), and is therefore said to be in a "superconducting state". However, if the current exceeds this critical current level, the superconductor will undergo a transition from its superconducting state to a "normal resistive state". This transition of a superconductor from its superconducting state to normal resistive state is termed "quenching". Quenching can occur if any one or any combination of the three factors, namely the operating temperature, external magnetic field or current level, exceeds the corresponding critical level. Mechanisms, using any one or a combination of these three factors, to induce and/or force a superconductor to quench, is usually referred to as a trigger mechanism.

A superconductor, once quenched, can be brought back to its superconducting state by bringing the operating environment to within the boundaries of its critical current, critical temperature and critical magnetic field range, provided that no thermal or structural damage was done during the quenching of the superconductor. HTS material can operate near the liquid nitrogen temperature (77° K) as compared with low-temperature superconducting (LTS) material that operates near liquid helium temperature (4° K). Manipulating properties of HTS material is thus much easier because of its higher and broader operating temperature range.

For some HTS materials, such as bulk BSCCO, YBCO and $MgB_2$, there often exists within the volume of the superconductor non-uniform regions resulting from the manufacturing process. Such non-uniform regions can develop into the so-called "hot spots" during the surge of current that exceeds the critical current level of the superconductor. Essentially, at the initial stage of quenching by the current, some regions of the superconductor volume become resistive before others do due to non-uniformity. A resistive region will generate heat at these non-uniform regions from its associated $i^2r$ loss. If the heat generated could not be propagated to its surrounding regions and environment quickly enough, the localized heating will damage the superconductor and could lead to the breakdown (burn-out) of the entire superconductor element.

U.S. Pat. No. 6,664,875 issued Dec. 16, 2003, entitled, "Matrix-Type Superconducting Fault Current-limiter", assigned to the assignee of the present invention, incorporated by reference herein in its entirety, uses a mechanism that combines all three of the quenching factors of the superconductor, namely current, magnetic field and temperature, to achieve a more uniform quenching of the superconductor during current-limiting. This so-called matrix-type, superconducting fault current-limiter (MFCL) concept can dramatically reduce the burnout risks in bulk superconducting materials due to the non-uniformity which exists in the superconductor volume. In addition, the detection of a fault and subsequent activation of the current-limiting impedance of the MFCL are done passively by the built-in matrix design, without assistance of active control mechanisms. This makes a fault current-limiter based on the MFCL concept more easily designed, built and operated for a wide range of potential current-limiting applications.

Excessive heating in HTS materials, caused by high fault currents, is minimized by using a shunt impedance to divert current from the HTS elements to the shunt impedance. In certain superconducting fault current-limiter (SCFCL) designs, two external windings (coils) are used, one to generate the trigger magnetic field and one as a shunt impedance. The large number of components (parts) due to the use of two coils per HTS element adds to the complexity of the design and is problematic in areas of manufacturability, size, weight, winding and interconnection power loss, and high voltage design.

SUMMARY OF THE INVENTION

Briefly summarized, in one aspect, the present invention comprises a superconducting fault current-limiter which includes a superconducting element and at least one variable-impedance shunt electrically coupled in parallel with the superconducting element. The superconducting element is configured to at least partially resistively or inductively limit a fault current passing therethrough, and the at least one variable-impedance shunt is configured to present a first impedance during a superconducting state of the superconducting element and a second impedance during a recovery transition of the superconducting element from a normal resistive state to the superconducting state. In operation, the superconducting element transitions from the superconducting state to the normal resistive state responsive to the fault current, and responsive thereto, the at least one variable-impedance shunt transitions from the first impedance to the second impedance, wherein the second impedance is a lower impedance than the first impedance. By transitioning the at least one variable-impedance shunt from the first impedance to the second impedance, current flow through the at least one variable-impedance shunt is facilitated during the recovery transition of the superconducting element under load from the normal resistive state to the superconducting state.

In another aspect, a superconducting fault current-limiter is presented herein which comprises a plurality of current-limiting modules electrically connected in series. Each current-limiting module comprises at least one superconducting element, and each superconducting element comprises at least one superconductor segment configured to at least partially limit a fault current passing therethrough by transitioning from a superconducting state to a normal resistive state. The superconducting fault current-limiter further comprises a plurality of variable-impedance shunts. Each variable-impedance shunt is associated with a respective current-limiting module of the plurality of current-limiting modules, and is configured to present a first impedance during the fault current and a second impedance during a recovery transition of the at least one superconductor segment of the at least one superconducting element of the associated current-limiting module from normal resistive state to superconducting state. The superconductor segments of the plurality of current-limiting modules together limit the fault current by transitioning from the superconducting state to the normal resistive state, and responsive thereto, the plurality of variable-impedance shunts transition from the first impedance to the second impedance, where the second impedance is a lower shunt impedance than the first impedance. This transition to the second impedance facilitates current flow through the respective variable-impedance shunts during a recovery transition of the at least one superconducting element of the respective current-limiting module from normal resistive state to superconducting state, thereby facilitating recovery of the at least one superconducting element under load.

In a further aspect, a method of fabricating a superconducting fault current limiter is provided. The method includes electrically connecting in parallel a superconducting element and at least one variable-impedance shunt, the superconducting element being configured to at least partially resistively or inductively limit a fault current passing therethrough by transitioning from a superconducting state to a normal resistive state, and the at least one variable-impedance shunt being fabricated to present a first impedance during the fault current and a second impedance during a recovery transition of the superconducting element from normal resistive state back to superconducting state; and wherein the second impedance of the at least one variable-impedance shunt is a lower impedance than the first impedance, and transitioning of the at least one variable-impedance shunt from the first impedance to the second impedance facilitates current flow through the at least one variable-impedance shunt during'recovery transition of the superconducting element from normal resistive state back to superconducting state after limiting the fault current, thereby facilitating recovery of the superconducting element under load.

Further, additional features and advantages are realized through the techniques of the present invention. Other embodiments and aspects of the invention are described in detail herein and are considered a part of the claimed invention.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

FIGS. 6A-6C depict one embodiment of a variable-impedance shunt for a superconducting fault current-limiter such as depicted in FIG. 2, in accordance with an aspect of the present invention;

FIG. 11 is a schematic of another embodiment of a superconducting fault current-limiter, wherein a saturation controlled, variable-impedance shunt is electrically connected in parallel with a superconducting element, in accordance with an aspect of the present invention;

FIG. 12 is a schematic of an alternate embodiment of a superconducting fault current-limiter, wherein a saturation controlled, variable-impedance shunt and a fixed impedance are both electrically connected in parallel with a superconducting element, in accordance with an aspect of the present invention;

DETAILED DESCRIPTION OF THE INVENTION

Various prior applications and patents focus on a quench triggering mechanism for a superconducting fault current-limiter. For example, reference U.S. Pat. Nos. 6,809,910, 6,958,893, 7,283,339, and 7,440,244, the entirety of each of which is hereby incorporated herein by reference. In contrast, the present invention is directed to a superconducting fault current-limiter with enhanced recovery of the superconducting element under load subsequent to limiting of a fault current.

Certain superconducting fault current-limiter topologies employ a parallel impedance reactance to further limit a fault current and allow a certain amount of current to flow when the superconducting element changes its impedance state from superconducting state to normal resistive state. If a shunt reactance is employed, high impedance values are required in order to increase the quenching dynamics during the fault limitation. However, a high shunt reactance is undesirable after occurrence of the fault condition, and during recovery time of the superconducting element, since it makes the recovery process from normal resistive state to superconducting state more difficult. Thus, described hereinbelow are superconducting fault current-limiters with variable-impedance shunts in parallel with the superconducting elements thereof, which present a high impedance during the fault transition and a different, lower (or minimal) impedance after the fault current has been quenched, during a recovery process of the superconducting element.

The superconducting fault current-limiters described herein may be employed with any low-temperature or high-temperature superconducting material. However, advantage is obtained by employing a high-temperature superconductor (HTS) as the superconductor segment(s) within the superconducting element(s) of the superconducting fault current-limiters presented herein. Such conductors can today be configured for self-triggering responsive to a fault current, that is, to change states from a superconducting state to a normal resistive state for limiting of the fault current based on the higher current value of the fault current itself. Before describing superconducting fault current-limiters further, an HTS superconductor segment for a superconducting element (such as discussed herein) is described below with reference to FIG. 1.

Figure 1:
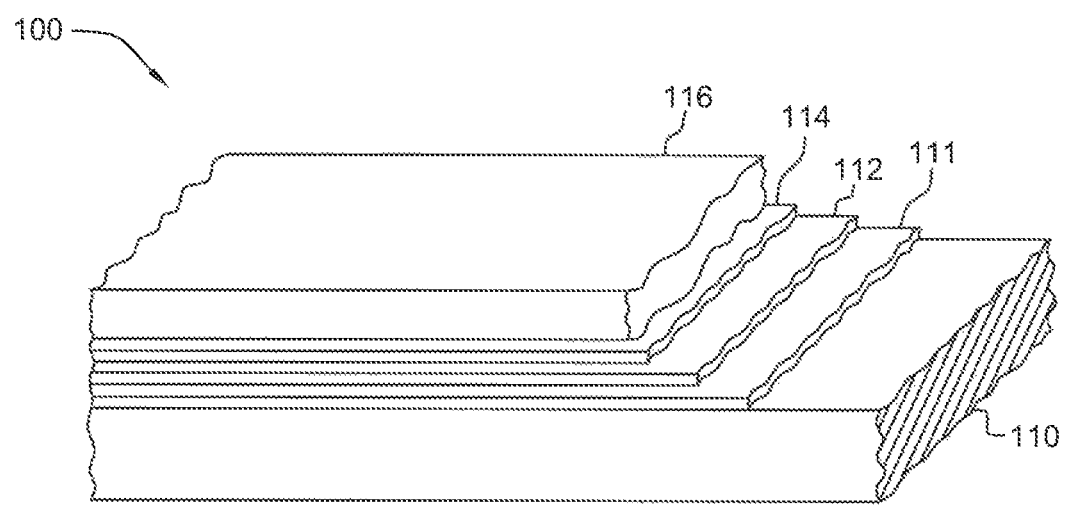
FIG. 1 illustrates one embodiment of a high temperature superconductor segment to be employed in a superconducting fault current-limiter, in accordance with an aspect of the present invention.

Referring to FIG. 1, the general layered structure of an HTS conductor 100 is depicted which can be employed as the superconducting element, or a portion of the superconducting element (e.g., in parallel with a plurality of such superconductor segments), of a superconducting fault current-limiter, in accordance with the present invention. The HTS conductor 100 includes a substrate 110, a buffer layer 111 overlying substrate 110, an HTS layer 112, followed by a capping layer 114, (typically a noble metal layer) and a stabilizer layer 116 (typically a non-noble metal). In the embodiment depicted in FIG. 1, buffer layer 111, HTS layer 112, capping layer 114 and stabilizer layer 116 are collectively referred to as the superconducting region, which as illustrated, is disposed along one main surface of substrate 110.

The substrate 110 is typically in a tape-like configuration, having a high aspect ratio. For example, the width of the tape is generally on the order of about 2-12 mm, and the length of the tape is typically at least about 100 m, most typically greater than about 500 m. Accordingly, the substrate may have an aspect ratio which is fairly high, on the order of not less than $10^3$, or even not less than $10^4$. Certain embodiments are longer, having an aspect ratio of $10^5$ and higher. As used herein, the term 'aspect ratio' is used to denote the ratio of the length of the substrate or tape to the next longest dimension, that is, the width of the substrate or tape.

In one embodiment, the substrate is treated so as to have desirable surface properties for subsequent deposition of the constituent layers of the HTS tape. For example, the surface may be lightly polished to a desired flatness and surface roughness. Additionally, the substrate may be treated to be biaxially textured as is understood in the art, such as by the known RABiTS (roll assisted biaxially textured substrate) technique.

Turning to buffer layer 111, the buffer layer may be a single layer, or more commonly, be made up of several films. Most typically, the buffer layer includes a biaxially textured film, having a crystalline texture that is generally aligned along crystal axes both in-plane and out-of-plane of the film. Such biaxial texturing may be accomplished by IBAD. As is understood in the art, IBAD is an acronym for Ion Beam Assisted Deposition, a technique which may be advantageously utilized to form a suitably textured buffer layer for subsequent formation of an HTS layer having desirable crystallographic orientation for superior superconducting properties. Magnesium oxide is a typical material of choice for the IBAD film, and may be on the order or 50 to 500 Angstroms, such as 50 to 200 Angstroms. Generally, the IBAD film has a rock-salt like crystal structure, as defined and described in U.S. Pat. No. 6,190,752, which is incorporated herein by reference in its entirety.

The buffer layer may include additional films, such as a barrier film provided to directly contact and be placed in between an IBAD film and the substrate. In this regard, the barrier film may advantageously be formed of an oxide, such as yttria, and functions to isolate the substrate from the IBAD film. A barrier film may also be formed of non-oxides such as silicon nitride and silicon carbide. Suitable techniques for deposition of a barrier film include chemical vapor deposition and physical vapor deposition including sputtering. Typical thicknesses of the barrier film may be within a range of about 100-200 angstroms. Still further, the buffer layer may also include an epitaxially grown film, formed over the IBAD film. In this context, the epitaxially grown film is effective to increase the thickness of the IBAD film, and may desirably be made principally of the same material utilized for the IBAD layer such as MgO.

In embodiments utilizing an MgO-based IBAD film and/or epitaxial film, a lattice mismatch between the MgO material and the material of the superconducting layer exists. Accordingly, the buffer layer may further include another buffer film, this one in particular implemented to reduce a mismatch in lattice constants between the HTS layer and the underlying IBAD film and/or epitaxial film. This buffer film may be formed of materials such as YSZ (yttria-stabilized zirconia) strontium ruthenate, lanthanum manganate, and generally, perovskite-structured ceramic materials. The buffer film may be deposited by various physical vapor deposition techniques.

While the foregoing has principally focused on implementation of a biaxially textured film in the buffer stack (layer) by a texturing process such as IBAD, alternatively, the substrate surface itself may be biaxially textured. In this case, the buffer layer is generally epitaxially grown on the textured substrate so as to preserve biaxial texturing in the buffer layer. One process for forming a biaxially textured substrate is the process known in the art as RABiTS (roll assisted biaxially textured substrates), generally understood in the art.

High-temperature superconductor (HTS) layer 112 is typically chosen from any of the high-temperature superconducting materials that exhibit superconducting properties above the temperature of liquid nitrogen, 77° K. Such materials may include, for example, $YBa_2Cu_3O_{7-x}$, $Bi_2Sr_2Ca_2Cu_3O_{10+y}$, $Ti_2Ba_2Ca_2Cu_3O_{10+y}$, and $HgBa_2Ca_2Cu_3O_{8+y}$. One class of materials includes $REBa_2Cu_3O_{7-x}$, wherein RE is a rare earth element. Of the foregoing, $YBa_2Cu_3O_{7-x}$, also generally referred to as YBCO, may be advantageously utilized. The HTS layer 112 may be formed by anyone of various techniques, including thick and thin film forming techniques. Preferably, a thin film physical vapor deposition technique such as pulsed laser deposition (PLD) can be used for a high deposition rates, or a chemical vapor deposition technique can be used for lower cost and larger surface area treatment. Typically, the HTS layer has a thickness on the order of about 1 to about 30 microns, most typically about 2 to about 20 microns, such as about 2 to about 10 microns, in order to get desirable amperage ratings associated with the HTS layer 112.

Capping layer 114 and stabilizer layer 116 are generally implemented for electrical stabilization, that is, to aid in prevention of HTS burnout in practical use. More particularly, layers 114 and 116 aid in continued flow of electrical charges along the HTS conductor in cases where cooling fails or the critical current density is exceeded, and the FITS layer moves from the superconducting state and becomes resistive. Typically, a noble metal is utilized for capping layer 114 to prevent unwanted interaction between the stabilizer layer(s) and the HTS layer 112. Typical noble metals include gold, silver, platinum, and palladium. Silver is typically used due to its cost and general accessibility. Capping layer 114 is typically made to be thick enough to prevent unwanted diffusion of the components from stabilizer layer 116 into HTS layer 112, but is made to be generally thin for cost reasons (raw material and processing costs). Typical thicknesses of capping layer 114 range within about 0.1 to about 10.0 microns, such as 0.5 to about 5.0 microns. Various techniques may be used for deposition of capping layer 114, including physical vapor deposition, such as DC magnetron sputtering.

According to a particular feature of an embodiment of the present invention, stabilizer layer 116 is incorporated, to overlie the superconducting layer 112, and in particular, overlie and directly contact capping layer 114 in the embodiment shown in FIG. 1. Stabilizer layer 116 functions as a protection/shunt layer to enhance stability against harsh environmental conditions and superconductivity quench. The layer is generally dense and thermally and electrically conductive, and functions to bypass electrical current in case of failure in the superconducting layer. Conventionally, such layers have been formed by laminating a pre-formed copper strip onto the superconducting tape, by using an intermediary bonding material such as a solder or flux. Other techniques have focused on physical vapor deposition, typically, sputtering. However, such application techniques are costly, and not particularly economically feasible for large-scale production operations. According to a particular feature of the embodiment, stabilizer layer 116 is formed by electroplating. According to this technique, electroplating can be used to quickly build-up a thick layer of material on the superconducting tape, and it is a relatively low cost process that can effectively produce dense layers of thermally and electrically conductive metals. According to one feature, the stabilizer layer is deposited without the use of or reliance upon and without the use of an intermediate bonding layer, such as a solder layer (including fluxes) that have a melting point less than about 300° C.

Electroplating (also known as electrodeposition) is generally performed by immersing the superconductive tape in a solution containing ions of the metal to be deposited. The surface of the tape is connected to an external power supply and current is passed through the surface into the solution, causing a reaction of metal ions ($M^{z-}$) with electrons ($e^-$) to form a metal (M), wherein:

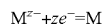

$$M^{z-}+ze^-=M$$

Capping layer 114 functions as a second layer for deposition of copper thereon. In the particular case of electroplating of stabilizer metals, the superconductive tape is generally immersed in a solution containing cupric ions, such as in a copper sulfate solution. Electrical contact is made to capping layer 114 and current is passed such that the reaction $Cu^{2+}+2e^- \rightarrow Cu$ occurs at the surface of capping layer 114. The capping layer 114 functions as the cathode in the solution, such that the metal ions are reduced to Cu metal atoms and deposited on the tape. On the other hand, a copper-containing anode is placed in the solution, at which an oxidation reaction occurs such that copper ions go into solution for reduction and deposition at the cathode.

In the absence of any secondary reactions, the current delivered to the conductive surface during electroplating is directly proportional to the quantity of metal deposited (Faraday's Law of Electrolysis). Using this relationship, the mass, and hence thickness of the deposited material forming stabilizer layer 116 can be readily controlled.

While the foregoing generally references copper, it is noticed that other metals, including aluminum, silver, gold, and other thermally and electrically conductive metals may also be utilized. However, it is generally desirable to utilize a non-noble metal to reduce overall materials cost for forming the superconductive tape.

While the foregoing description and FIG. 1 describes electroplating to form stabilizer layer 116 along one side of the superconductive tape, it is also noted that the opposite, major side of the superconductive tape may also be coated, and indeed, the entirety of the structure can be coated so as to be encapsulated. Those skilled in the art will note that the above-description of HTS conductor 100 in FIG. 1 is provided by way of example only. The superconducting elements discussed hereinbelow may utilize any appropriate superconducting tape or bulk material, without departing from the scope of the claims provided herewith.

Figure 2:
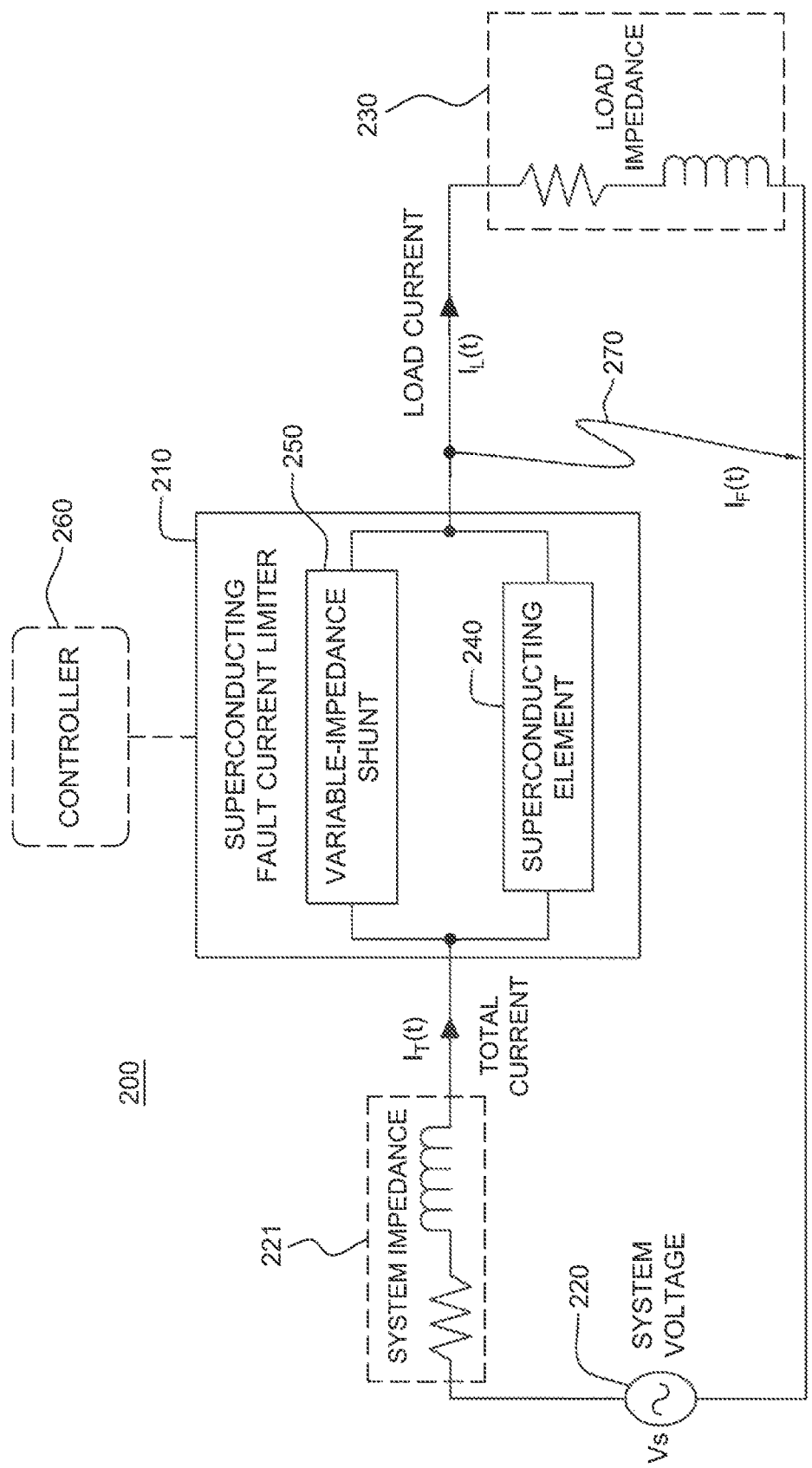
FIG. 2 is a schematic of one embodiment of an electrical system, such a s power grid system, employing one or more superconducting fault current-limiters, in accordance with an aspect of the present invention.

FIG. 2 is a schematic of one embodiment of an electrical system 200, such as a power distribution system or network, which includes one or more superconducting fault current-limiters 210, in accordance with an aspect of the present invention. As one example, the electrical system is a power grid, wherein system voltage 220 is supplied across transmission and/or distribution lines (having system impedance 221) and superconducting fault current-limiter 210 to a load impedance 230. Superconducting fault current-limiter 210 comprises a superconducting element 240 and a variable-impedance shunt 250 electrically connected in parallel therewith. As illustrated, a controller 260 may optionally be provided to control transitioning of the variable-impedance shunt from (for example) a first, higher impedance to a second, lower impedance, and back, as explained further below. Presence and implementation of controller 260 depends on the particular implementation of the variable-impedance shunt employed. (For example, in various implementations, controller 260 may comprise a computer-implemented controller, and current and/or voltage sensor(s), for controlling impedance through the variable-impedance shunt.) Certain variable-impedance shunts will require no control mechanism since they are inherently configured to transition from the first impedance to the second impedance responsive to limiting of the higher fault current.

As illustrated, a load current $I_L(t)$ powers the load impedance 230. Upon occurrence of a fault current 270, such as a short circuit fault current $I_F(t)$, the total current $I_T(t)$ increases significantly due to the short circuit. In the embodiments described herein, the superconducting fault current-limiter, and in particular, superconducting element 240, is configured to resistively limit this fault current by quenching or transitioning from superconducting state to normal resistive state.

Figure 3:
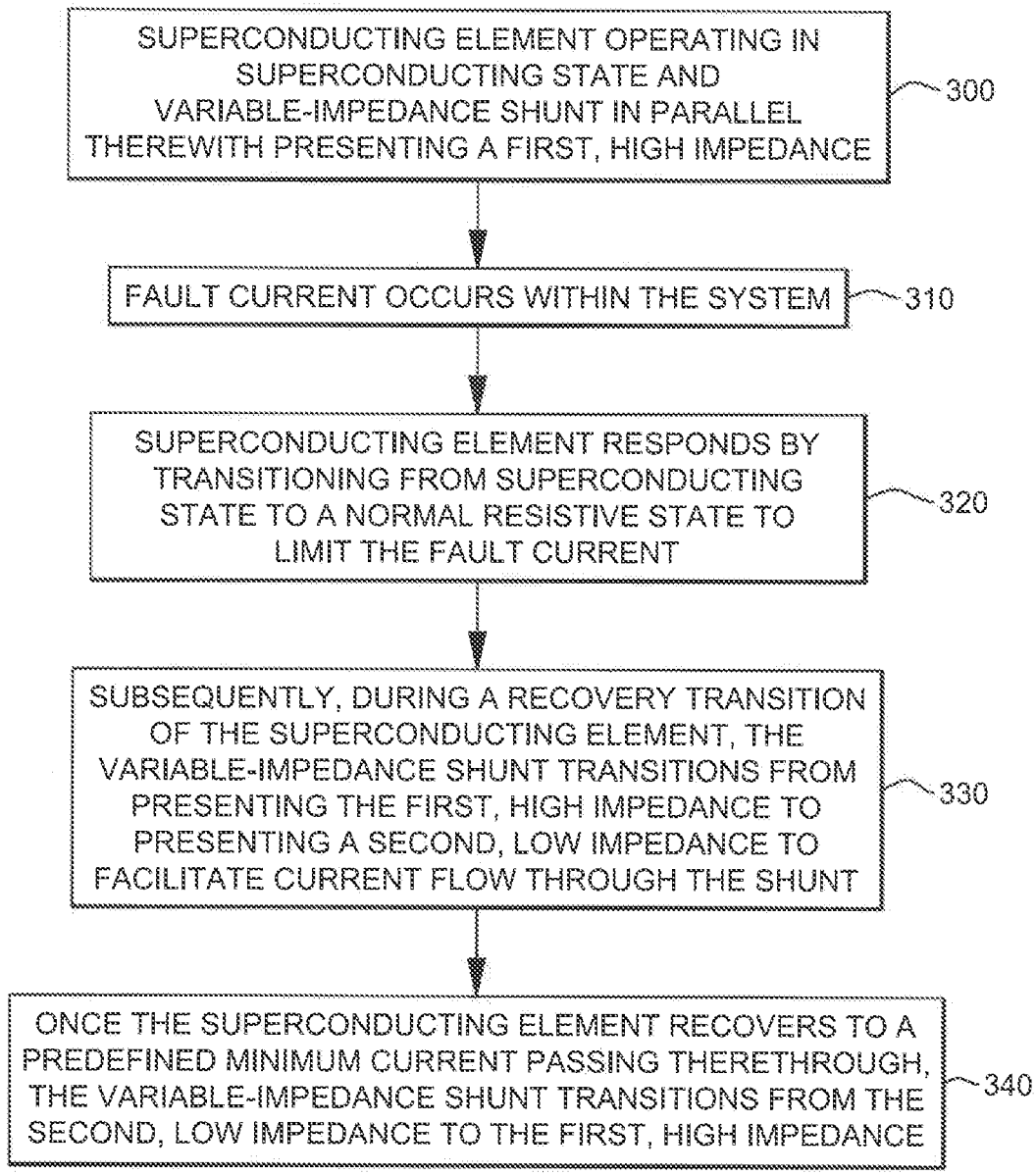
FIG. 3 is a flowchart of one operational implementation of a superconducting fault current-limiter, in accordance with an aspect of the present invention.

FIG. 3 is a flowchart of an operational embodiment of a superconducting fault current-limiter, such as described above in connection with FIG. 2. As shown, the superconducting element typically operates in a superconducting state, with the variable-impedance shunt in parallel therewith presenting a first, high impedance 300. Upon occurrence of a fault current within the electrical system 310, the superconducting element responds by transitioning from the superconducting state to a normal resistive state to limit current by the quenching of the superconductor 320. Subsequently, during a recovery process of the superconducting element, the variable-impedance shunt transitions (or is transitioned) from presenting the first, high impedance to presenting a second, low impedance to facilitate current flow through the shunt and therefore recovery of the superconducting element under load 330. Once the superconducting element recovers to a predefined minimum current level (or minimum percentage of the current typically passing therethrough), the variable-impedance shunt transitions back from the second, low impedance to the first, high impedance 340. This ensures that should a second fault current occur before the superconducting element fully recovers to the superconducting state (after limiting the first fault current), that the variable-impedance shunt is at the first, high impedance level.

As noted, a superconducting fault current-limiter (in accordance with the present invention) includes at least one superconducting element, such as an HTS element, coupled in parallel with a variable-impedance shunt. The variable-impedance shunt comprises (in one embodiment) a shunt coil coupled in parallel with the superconducting element to form the base structure of the superconducting fault current-limiter. As described further below, the variable-impedance of the shunt coil may be implemented using a number of different approaches, including mechanical movement of the shunt coil relative to an associated core, or controlled saturation of an associated core.

Under normal operating conditions, the superconducting element will have no resistance, and thus all current will flow through it. Consequently, there is no voltage drop across the whole arrangement, and the parallel-connected, variable-impedance shunt will have no current flowing through it. Once a fault current occurs, however, the current surge will exceed the critical current level of the superconducting element and cause it to quench immediately, thus generating a sufficiently large voltage drop across the variable-impedance shunt to result in part of the overall current being diverted into the shunt. The shunt will act to limit the voltage generated by the superconductor and will share the total current load to ensure that the superconductor does not overheat and can quickly return to its normal state once the fault has been removed or partially removed. Advantageously, the shunt is controlled such that its impedance is varied during at least a portion of the recovery process of the superconductor from the fault current.

Specifically, the variable impedance shunt is transitioned from a first, high impedance level to a second, low impedance level to facilitate the initial recovery process. Once the recovery current flow through the superconducting element reaches a threshold level (or a threshold percentage), then impedance of the variable-impedance shunt is transitioned back to the first, high impedance level. This ensures that the superconducting fault current-limiter is able to handle a subsequent fault current, notwithstanding that the superconducting element has not fully recovered (i.e., has only partially recovered) from the first fault current. In one implementation, the variable-impedance shunt may be transitioned back to the first, high impedance level once 10%-90% of the normal operating current level has been restored through the superconducting element. Depending upon the application, however, other threshold percentages or threshold current level settings may be employed.

Using the above-described arrangement as a base module, a matrix current-limiter can be configured to have at least one row and at least one column of such modules, wherein each module is coupled in parallel with each other module in each column, and each column is coupled in series with each other column. The modular nature of such a superconducting fault current-limiter makes it adaptable to high voltage and/or high current operating environments of a power system to which it connects.

Figure 4:
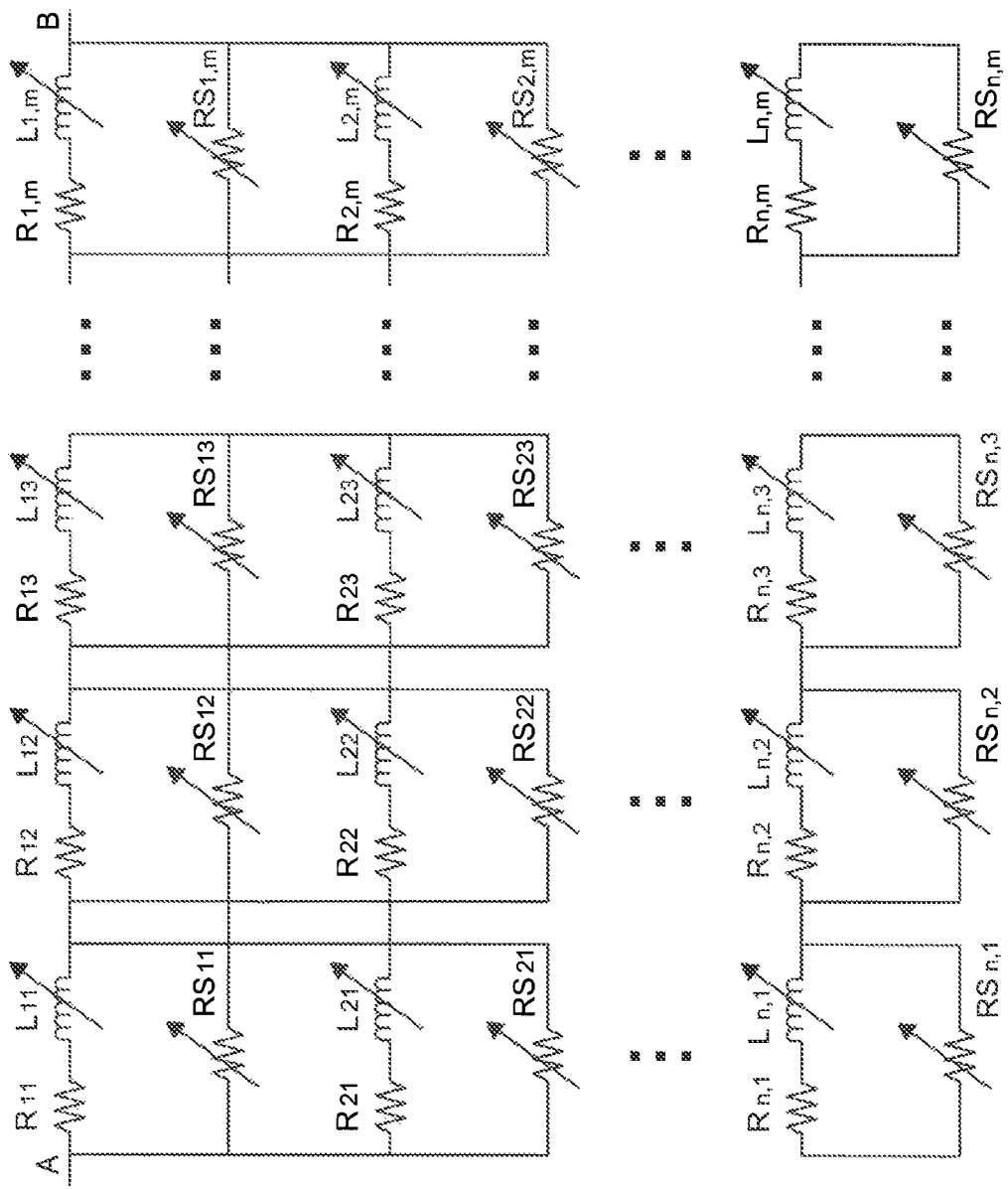
FIG. 4 is a schematic illustration of a matrix-type, superconducting fault current-limiter, wherein a variable-impedance shunt is coupled in parallel with a superconducting element within each current-limiting module of the matrix-type, superconducting fault current-limiter, in accordance with an aspect of the present invention.

FIG. 4 illustrates an exemplary embodiment of a matrix-type, superconducting fault current-limiter 400 comprising "n" rows and "m" columns of the basic current-limiter described above in connection with FIG. 2. In row 1, column 1, the variable-impedance shunt is depicted by resistor $R_{11}$ and variable inductor $L_{11}$ in series, which together are in parallel with the variable resistance of the superconducting element $RS_{11}$. In row 2, column 1, the variable-impedance shunt is depicted by resistor $R_{21}$ and series connected variable inductance $L_{21}$, and the superconducting element is depicted by variable resistance $RS_{21}$. In row "n", column 1, the variable-impedance shunt is depicted by resistor $R_{n,1}$ in series with variable inductance $L_{n,1}$ and the superconducting element is depicted by variable resistance $RS_{n,1}$. Correspondingly, in row "n", column "m", the variable impedance shunt is represented by resistor $R_{n,m}$ in series with variable inductance $L_{n,m}$, and the superconducting element is represented by variable resistance $RS_{n,m}$.

It logically follows from this arrangement of basic fault current-limiters that a matrix fault current-limiter can be highly modular and scalable, so that the superconducting fault current-limiter assembly can be designed and sized to accommodate various fault current-limiting application requirements. The modular nature of this matrix-type superconducting fault current-limiter makes it extremely adaptable to high voltage and/or high current operating requirements of a power system to which it connects. For high voltage applications, the total voltage is divided amongst the multiple columns of the matrix assembly, which substantially simplifies the dielectric design of the matrix-type superconducting fault current-limiter to meet various high voltage insulation requirements. Furthermore, combinations of different numbers of rows and columns can be used to address applications that have both high voltage and high current operating requirements, and different current-limiting requirements.

Operation of an electrical power system incorporating a matrix-type, superconducting fault current-limiter is next described. As noted, the shunt is used to limit the maximum voltage drop that may develop across each superconducting element after it quenches. A portion of the fault current will be shunted away from the superconducting element into the shunt, and thus reduce the heat generated in the superconducting element in the form of $i^2r$ losses to protect against potential thermal and mechanical damage to the superconducting element. This also improves the thermal recovery of the superconducting element and therefore the recovery time of the fault current-limiter once the fault is removed, and since the voltage developed is limited by the shunt, it also limits the temperature rise of the superconducting element during its quenching and subsequent states. Advantageously, in accordance with the present invention, the shunt is a variable-impedance shunt, and impedance through the shunt is controlled so that a lower impedance is presented during a recovering phase of the superconducting element after limiting the fault current. This reduced impedance allows the superconducting element to better recover under load by diverting a higher portion of the current through the shunt while the superconducting element recovers.

In the matrix configuration depicted in FIG. 4, the combined superconductor critical current level corresponds to the "n" number of rows of the fault current-limiter 400 during normal operation, and is designed to be no less than the peak of the nominal AC operating current plus any over-current capacity required by the power system. The fault current-limiter module in each row of the fault current-limiter will see about 1/n of this total system current. Within each fault current-limiter, the variable-impedance shunt is designed to have a high impedance during normal operating condition and a low impedance during the recovery process of the superconducting element. This low impedance is designed to be substantially lower than the quenched resistance of the superconducting element so that current is directed through the variable-impedance shunt, thereby allowing the superconducting element to more readily recover under load. As noted, the fault current-limiter exhibits no electrical resistance during normal operation of the power system since the system current is below its critical current level, which results in no voltage drop across the fault current-limiter. Therefore, no current will be diverted into the variable-impedance shunts, and thus, no power losses will be generated in the variable-impedance shunts during normal operation.

When a fault occurs in the electrical power system, the surge current flowing through the matrix-type, superconducting fault current-limiter increases to multiples of the normal operating current. Consequently, the superconducting elements will begin to transition from a superconducting state to a normal resistive state, also called "quenching". The resistance or inductance generated by the superconducting elements in this quench state will cause a voltage to be generated across the superconducting elements. This voltage will then generate a current through the variable-impedance shunts since they are electrically coupled in parallel with the superconducting elements. Once the initial quench starts, the subsequent $i^2r$ heating within the superconducting elements contributes to the quenching process. Together, the current surge and the temperature rise operate to promote a fast and uniform quenching of the superconducting elements and to prevent burn-out due to material defects. The modularity of the matrix-type, superconducting fault current-limiter provides built-in redundancy in the design such that a failure in any individual superconductor (or superconducting element) in the fault current-limiter does not result in failure of the entire device.

The transition of the variable-impedance shunts from the first, high impedance level to the second, low impedance level during the recovery process facilitates recovery of the individual superconducting elements by temporarily shunting current within the system through the variable-impedance shunts to allow continued delivery of current to the load, while simultaneously facilitating recovery of the superconducting elements to the superconducting state. Depending upon the implementation, at some defined point during the recovery process, for example, once current through the superconducting elements achieves a defined level, impedance of the variable-impedance shunt is returned to the normal operating impedance, that is, the higher impedance which inhibits passage of current through the shunts.

Benefits of this structure are numerous. For example, there is negligible $i^2r$ losses during normal operation of the matrix-type, superconducting fault current-limiter, and the current-limiter will have no impact on normal system operation. The implementation depicted in FIG. 4 and described above is modular in nature for easy scalability and manufacturability, because the basic fault current-limiter can be arranged in an "n" row x "m" column matrix configuration to accommodate various application requirements. In addition, variable-impedance shunts are employed to improve the recovery process subsequent limiting of the fault current, thereby allowing faster return to the superconducting state under load. Depending upon the implementation, the matrix-type, superconducting fault current-limiter described herein may be configured to perform current-limiting functions without active fault sensing and limiting control mechanisms.

Figures 5A, 5B:
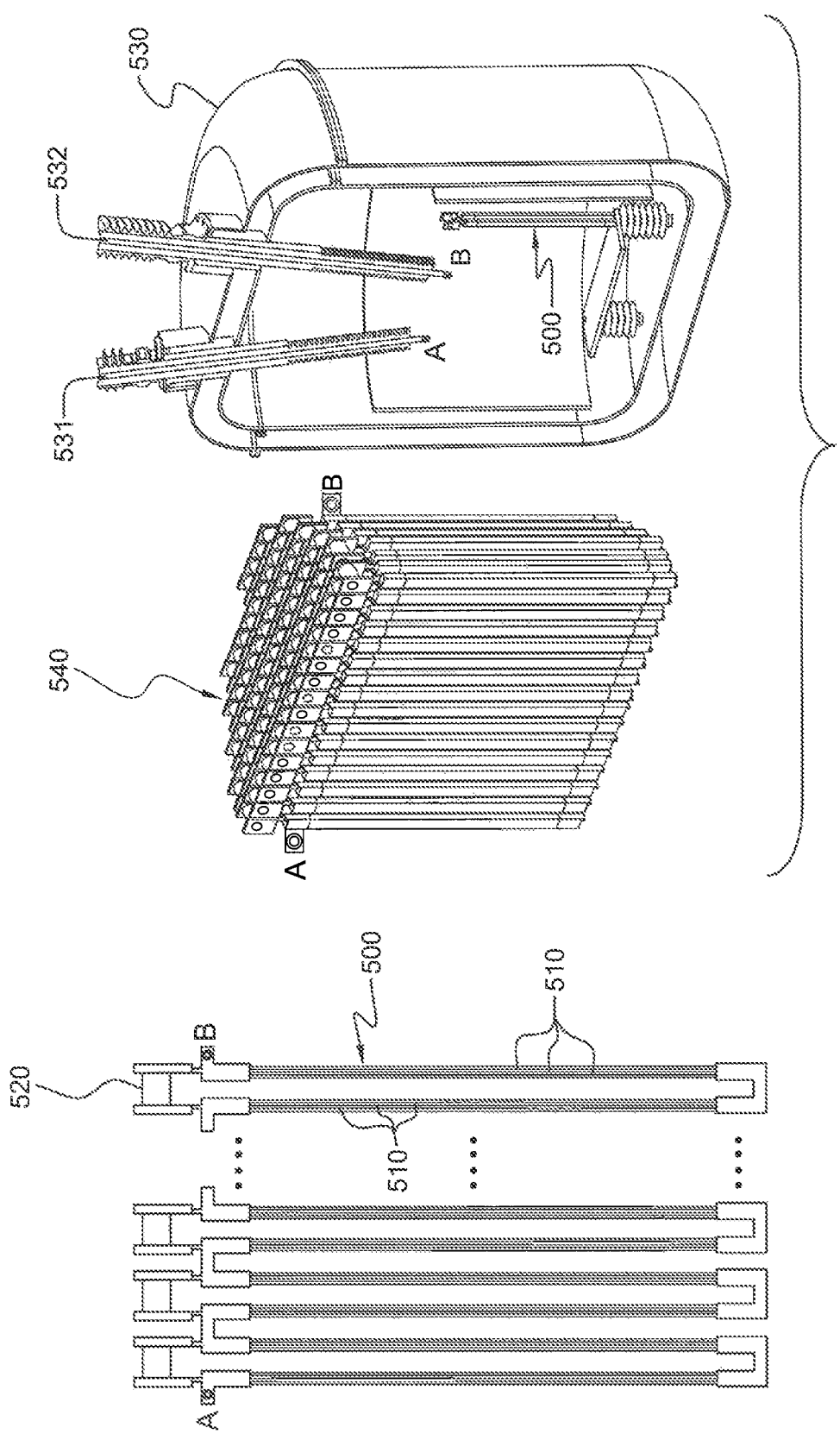
FIG. 5A is a partial elevational view of another matrix-type, superconducting fault current-limiter implementation, in accordance with an aspect of the present invention.
FIG. 5B is a partially exploded, partial perspective view of the matrix-type, superconducting fault current-limiter of FIG. 5A, in accordance with an aspect of the present invention.

One practical implementation of a matrix-type, superconducting fault current-limiter is depicted in FIGS. 5A & 5B. In this example, each current-limiting module (or column) employs a single variable-impedance shunt in parallel with at least one superconducting elements, each of which comprises a plurality of superconductor segements.

Referring first to FIG. 5A, a matrix-type, superconducting fault current-limiter is presented wherein a current-limiting module 500 (e.g., comprising a column of fault current-limiters in the matrix example of FIG. 4) comprises, in this configuration, one or more series, electrically connected superconducting elements 510, each comprising a plurality of superconductors, such as a plurality of layers of superconducting tape coupled in parallel with a variable-impedance shunt 510. These current-limiting modules are connected in series between a first primary connection A and a second primary connection B. The size, configuration and number of superconductors within each current-limiting module 500 may vary, depending on the high voltage and high current operating requirements of a particular implementation, and the different current-limiting requirements. In one example, each superconductor layer (or tape) comprises an HTS conductor.

FIG. 5B depicts a partially exploded, cross-sectional view of the matrix-type, superconducting fault current-limiter partially shown in FIG. 5A. In this embodiment, the individual fault current-limiter modules 500, which are connected in series between primary contacts A & B, are exploded from the vessel 530 which is sized to house the matrix. By way of example, a single current-limiting module 500 is illustrated in position within vessel 530. As illustrated, power lines 531, 532 connect to matrix 540 via the primary connections A & B to the matrix. In this implementation, a single-phase, fault current-limiting structure is depicted. In a three-phase embodiment, each phase would have a fault current-limiting structure such as depicted. Alternatively, the vessel could be reconfigured such that the fault current-limiting structures for each phase of a three phase implementation would be contained within a single vessel. In operation, a coolant, such as liquid nitrogen, is pumped through the vessel to ensure that the superconducting elements remain at a temperature conducive to establishing and remaining in superconducting state. The superconducting fault current-limiter described herein resistively or inductively limits the fault current with quenching from the superconducting state to the normal resistive state of the individual superconducting elements. This resistive or inductive limiting results in a temperature rise within the vessel, which is removed by the liquid nitrogen as it is pumped through the vessel.

Those skilled in the art will note from the above discussion, that the particular embodiment of FIGS. 5A & 5B is one example only of the matrix-type, superconducting fault current-limiter presented herein. More generically, the plurality of series-connected, fault current-limiting modules depicted in these figures may be implemented as a single superconducting element in parallel with a single, variable-impedance shunt. The number of superconductors (or superconducting elements), and the number of variable-impedance shunts may vary, depending upon the fault current-limiting implementation at issue.

FIGS. 6A-18D depict various implementations of a fault current-limiter (or the variable-impedance shunt thereof), in accordance with the present invention. Initially, with reference to FIGS. 6A-7B, a mechanically controlled variable-impedance shunt is described, with the remaining figures presenting various embodiments of a saturation controlled, variable-impedance shunt, any one of which could be used in a fault current limiter in accordance with the present invention.

Referring first to FIGS. 6A-6C, one embodiment of a variable-impedance shunt is illustrated comprising a cylindrical-shaped core 600 with a helical coil 610 wound to surround at least a portion of the core. Variable-impedance is obtained using different techniques with the help of the core, which is assumed to have a larger permeability than air. In operation, core 600 is assumed typically stationary within helical coil 610, having from the beginning a high impedance value based on permeability of the core material and the coil used. When a fault current occurs, core 600 and coil 610, which are disposed co-axial as shown, are separated; for example, employing a mechanical actuator (not shown) responsive to quenching of a fault current by the superconducting element. This movement is illustrated in FIGS. 6B & 6C, wherein the impedance continues to lower as core 600 and coil 610 are moved apart.

In another approach, in the absence of a fault current, the core may be disposed outside the coil and be stationary. Responsive to a fault current, the core and coil may be transitioned such that the core is at least partially within the coil. In this approach, the coil and core would be designed so that the core is attracted to the center of the coil, increasing the reactance value as a function of the permeability of the core material, resulting in higher limitation of the fault. When the fault is over, the core is mechanically removed from the coil, for example, via spring actuation, or by its own weight due to gravity. Any of these forces should be larger than the magnetic force after the fault, but smaller than the magnetic coupling force during the fault condition in order that the core may be attracted into the coil.

In the embodiment of FIGS. 6A-6C, where the core resides within the coil during its stationary, normal operating position and is moved out during the recovery process to lower impedance of the shunt, the core is moved back within the coil as the superconducting element is returning to the superconducting state. By reducing reactance of the shunt winding, more current will flow through the shunt and less through the superconducting element, thereby facilitating the recovery process of the superconducting element. Thus, whether the core is employed in normal operation stationary within the coil or outside of the coil, the cancellation principle is the same. A large impedance is presented by the shunt during the fault condition, and a lower impedance is presented by the shunt during the recovery process of the superconducting element.

The coil and core of the variable-impedance shunt may be fabricated of different configurations and materials to enhance performance. For instance, a tapered shape may be used, where both the coil and the core are made with a tapered diameter. Split coils and/or split cores can also be used with windings in either the same or opposite directions. If the coils are wound in the same direction, they will couple the magnetic fields produced by both coils when they are placed closely along the same axis. Through this technique, the magnetic field, the inductance and the overall impedance of the coils can be enhanced to a large extent. In this configuration, a spring may also be used to diminish the forces of both cores meeting at the middle, as shown in FIG. 7A.

Figure 7B:
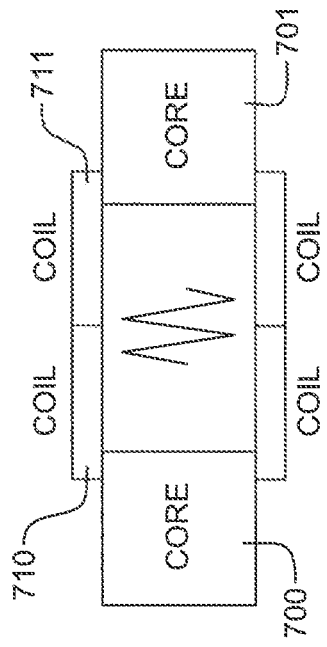
FIGS. 7A & 7B depict an alternate embodiment of a variable-impedance shunt for a superconducting fault current-limiter such as depicted in FIG. 2, in accordance with an aspect of the present invention.
Figure 7A:
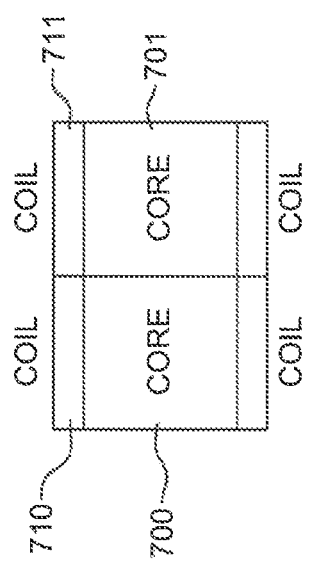

In FIG. 7A, a first coil 710 encircles a first core 700 and a second coil 711 encircles a second core 701, with coils 710, 711 and cores 700, 701 being similarly configured and co-axially disposed adjacent to each other. As explained above, the cores and coils may be used in different modes. For example, the core-to-coil positioning may be such that either the cores are fully inside the coils, partially inside the coils or fully outside of the coils during normal superconducting state operation of the superconducting fault current limiter, but in all cases, the cores are moved further from the coils after limiting of the fault condition to lower their impedance, and thereby facilitate the recovery process of the superconducting element under load.

In the embodiment of FIGS. 7A & 7B, the coils and cores are aligned along a common axis to couple further any magnetic fields on the surroundings. This coupling of the magnetic field and inductance, will change with the alignment and with the resultant spacing and angles forming between them. When a fault occurs, the cores are moved, in one embodiment, inside the coils due to the attraction between the cores and the windings. The direction of attraction may be determined by the winding direction of the coils. They can be smoothly stopped with the help of a spring force, with an elastic material being used as the spring. When the cores are inside, they present a higher impedance, and vice versa.

Figure 8A:
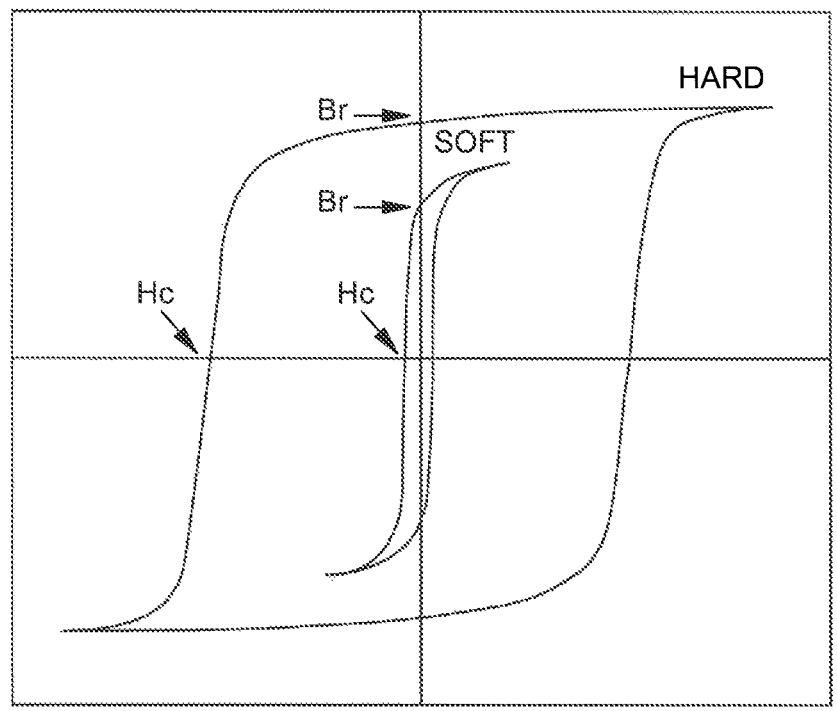
FIG. 8A is a graph of a typical hysteresis loop plotting magnetism versus magnetic field strength for a soft magnetic material versus a hard magnetic material.
Figure 8B:
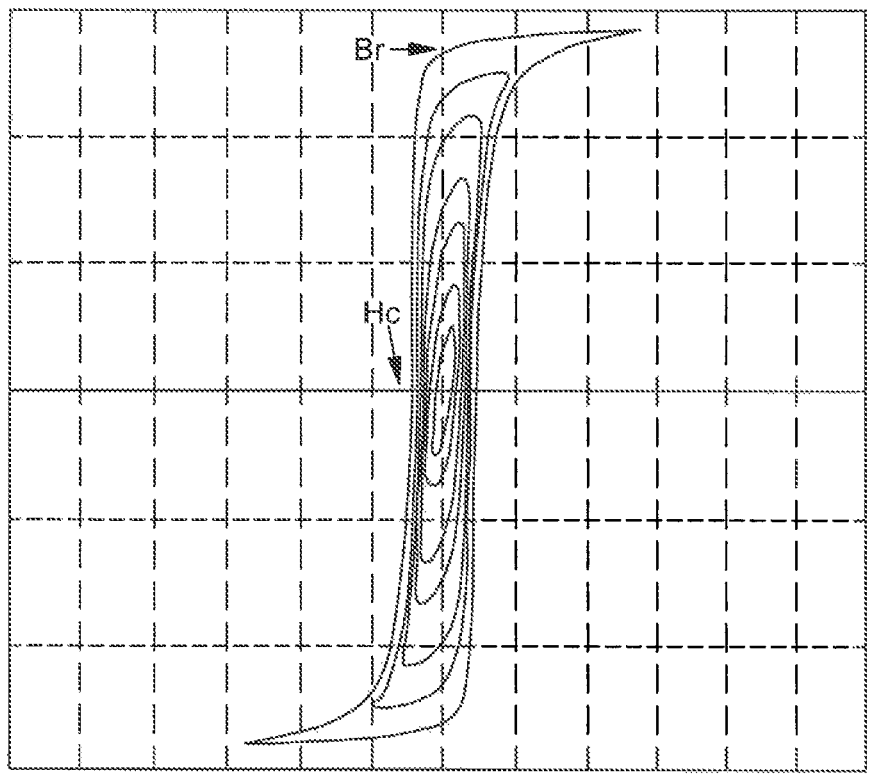
FIG. 8B illustrates a typical hysteresis loop for a non-linear magnetic material, such as iron.

A variable shunt reactance (or impedance) can also be implemented using one or more stationary coils and one or more stationary cores. FIG. 8A illustrates a typical hysteresis loop of a soft magnetic material versus a hard magnetic material, while FIG. 8B illustrates a typical hysteresis loop of a non-linear material, such as iron. In the hysteresis graphs, where the lines cross the magnetic flux density on the y axis is denoted the remanence (or more commonly, the retentivity), and is denoted as "Br". This is the value of the magnetic flux density after saturation when the applied magnetic intensity is zero. In the same manner, where the hysteresis lines cross the magnetic field intensity H on the x axis is referred to as the coercivity, and denoted as "Hc". This value corresponds to the magnetic field intensity at which the magnetic flux density is zero. Because the B/H lines do not increase linearly, the materials present saturation after increasingly larger values of H. Therefore, any decrease in effective permeability or decrease in the slope of the B-H curve, for increasing applied magnetic field intensity levels, is known as saturation.

Soft materials with sharper hysteresis curves are desirable to avoid delays in the saturation and reverse saturation times. However, the system can be designed with a harder saturation curve to elongate the saturation time on purpose. This is useful for a) multiple fault sequence scenario, where successive faults are placed very close, being not enough time to recover the superconducting element, and thus, the variable-impedance of the shunt should stay low for a longer period of time. Soft materials have slim loops, being easy to magnetize and de-magnetize since they have high magnetic permeability. The saturation time may be reduced to a few nanoseconds using materials with sharp hysteresis loops. If the saturation time is too large, due to not enough dV/dt and dI/dt imposed by the circuit, varying the cross-section of the cores will diminish or increase the saturation time. Multiple cores can be used if the saturation time is too large, and vice versa.

Figure 9:
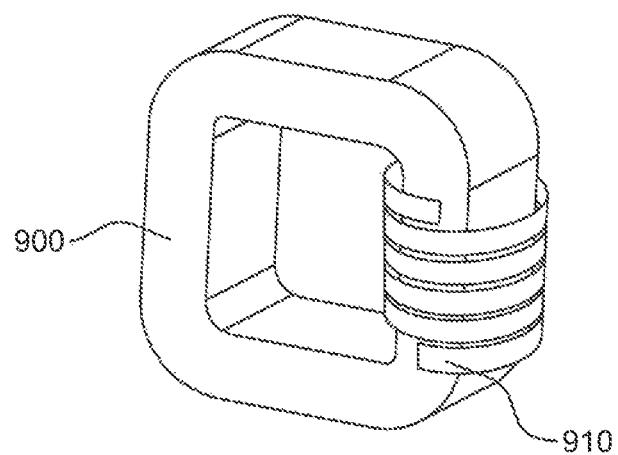
FIG. 9 depicts another embodiment of a variable-impedance shunt for a superconducting fault current-limiter such as depicted in FIG. 2, in accordance with an aspect of the present invention.
Figure 10:
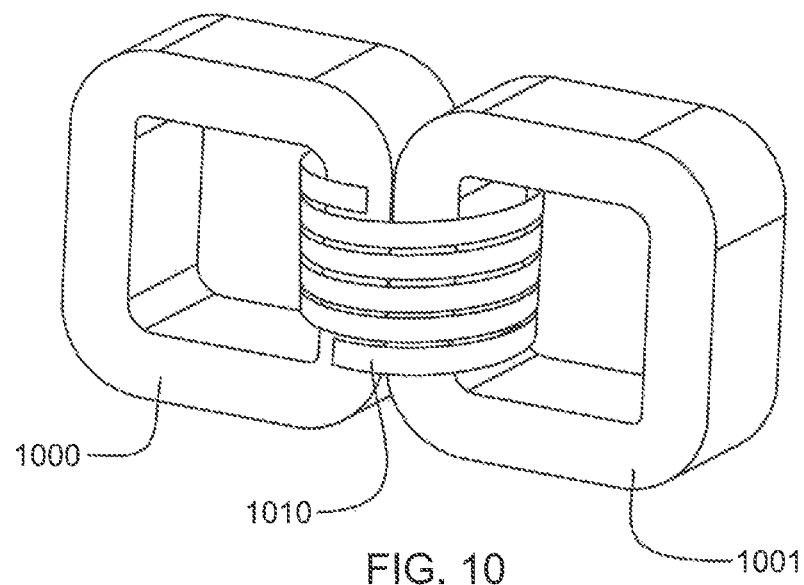
FIG. 10 depicts an alternate embodiment of a variable-impedance shunt for a superconducting fault current-limiter such as depicted in FIG. 2, in accordance with an aspect of the present invention.

Different core shapes may be used in implementing a saturation controlled, variable-impedance shunt such as described herein. In FIG. 9, a toroidal-shaped saturation core 900 is shown with a shunt coil 910 partially wound around the toroidal-shaped saturation core. In FIG. 10, a pair of stationary, toroidal-shaped saturation cores 1000, 1001 are employed with a single shunt coil 1010 wound around a portion of both saturation cores 1000, 1001. The shunt coil employed in these configurations may either be made with a single layer of wire, or of multi-layer windings to achieve larger inductances.

As explained below, a delay in the saturation can be introduced by employing multiple, series-connected shunt stages. Hence, the series connected shunt stages govern the rate of saturation for each respective core in the circuit. However, if the current is sufficiently high, as occurs during a fault current event, the saturation delay will not be noticeable since the shunt coils will present much higher dI/dt rates, also resulting in saturation for longer periods of time and longer differential remnant voltage tails after the saturation.

The magnitude difference in the magnetic field (and consequently its cancellation) is noticeable, as well as the reduction in inductance, which is canceled proportionally. In order to achieve a larger range between the high and low impedances, a low inductance value is desirable when the core is saturated. Hence, low inductance values are also desirable for designs where the cores are removed. For this purpose, conductor strips with wide widths and small thicknesses may be used to achieve a low, no-core inductance or a saturated-core inductance with a cross-section sized for the required current flowing through it.

The impedance magnitude of the stationary coil and core will change from high impedance to low impedance with saturation of the core. This reduced impedance will allow for faster recovery of the superconducting element. The low impedance is maintained during the saturation point of the core material.

When saturated, the impedance magnitude of the shunt is equivalent to the air core impedance of the coil around the core, as explained in the example of FIGS. 6A-6C, when the core is removed outside the coil.

FIG. 11 depicts one embodiment of a superconducting fault current-limiter 1100 connected within a system, such as a power grid system, for limiting a fault current. Superconducting fault current-limiter 1100 includes a superconducting element 1110 and a saturation controlled, variable-impedance shunt 1120. In this example, the saturation controlled, variable-impedance shunt 1120 comprises a shunt coil and a saturatable core, such as described above. The fault current-limiter of FIG. 11 may be modified to include a fixed impedance Z1, such as illustrated in the superconducting fault current-limiter 1200 of FIG. 12. In this embodiment, superconducting fault current-limiter 1200 is again assumed to be connected within a system for limiting a fault current. The current-limiter includes a superconducting element 1210 and a saturation controlled, variable-impedance shunt 1220 in parallel with the superconducting element. Fixed impedance Z1 1230 is also in parallel with the superconducting element as illustrated, and provides a known minimum impedance through the superconducting fault current-limiter.

Figure 13:
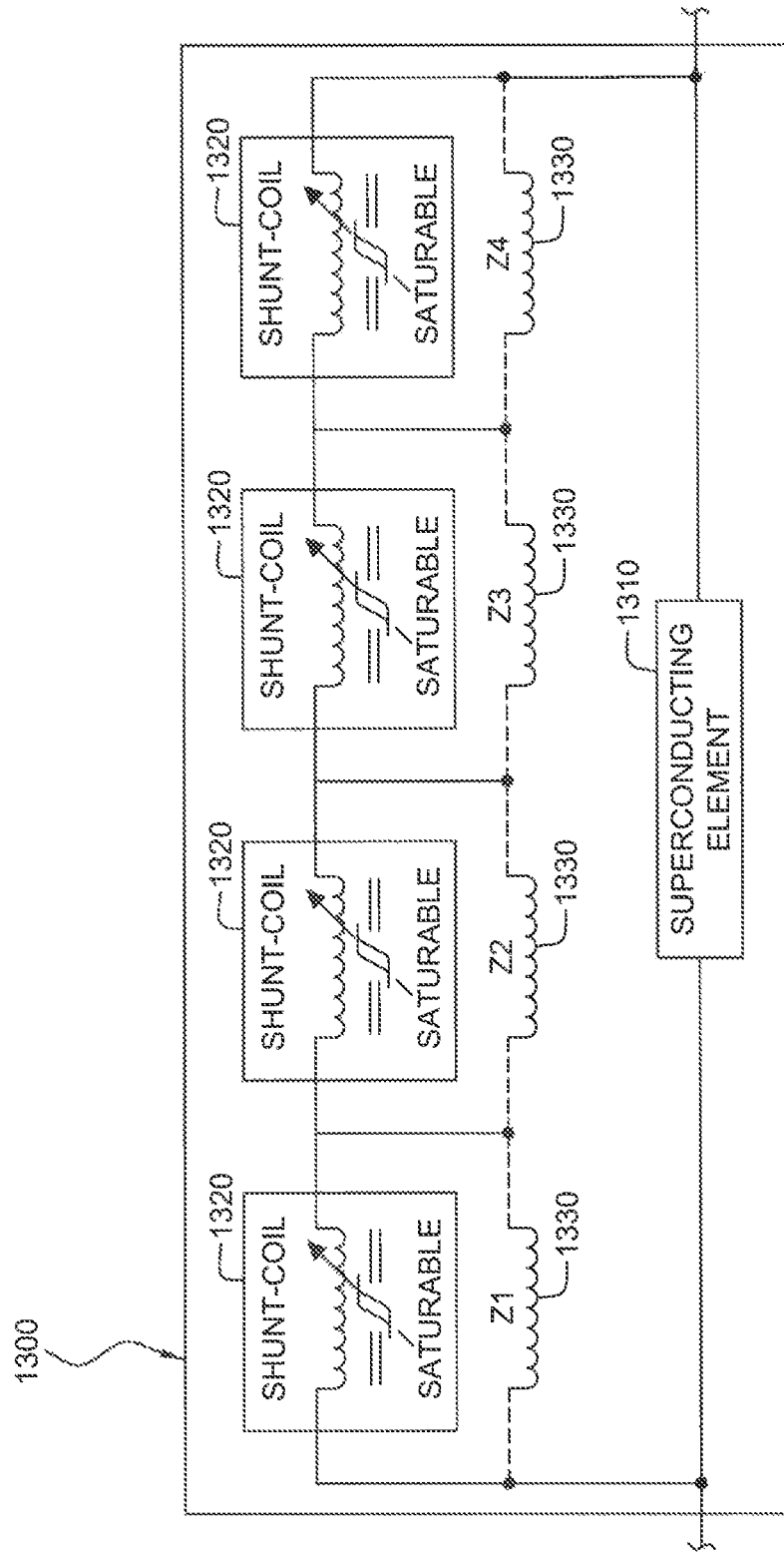
FIG. 13 is a schematic of a further embodiment of a superconducting fault current-limiter, wherein multiple series connected, variable-impedance shunt stages are electrically connected in parallel with a superconducting element, in accordance with an aspect of the present invention.

In another embodiment, different, series connected, variable-impedance shunt stages, each configured as the above-described saturation controlled, variable-impedance shunt with fixed impedance in parallel therewith, may be connected in parallel across the superconducting element of the superconducting fault current-limiter, such as depicted in FIG. 13. In this embodiment, the superconducting fault current-limiter 1300 is shown to include four saturation controlled, variable-impedance shunt stages 1320 connected in series, with each stage 1320 having a corresponding fixed impedance Z1, Z2, Z3 & Z4 connected in parallel. By connecting multiple variable-impedance shunt stages in series as illustrated, it is possible to readily match any desired impedance profile. The entire series connected circuit will show an equivalent impedance magnitude as a function of the saturated (or unsaturated) cores of the different stages at any moment in time. Based on the number of turns and the properties of the core material selected, the saturation time can be adjusted by one skilled in the art, as desired.

Figure 14:
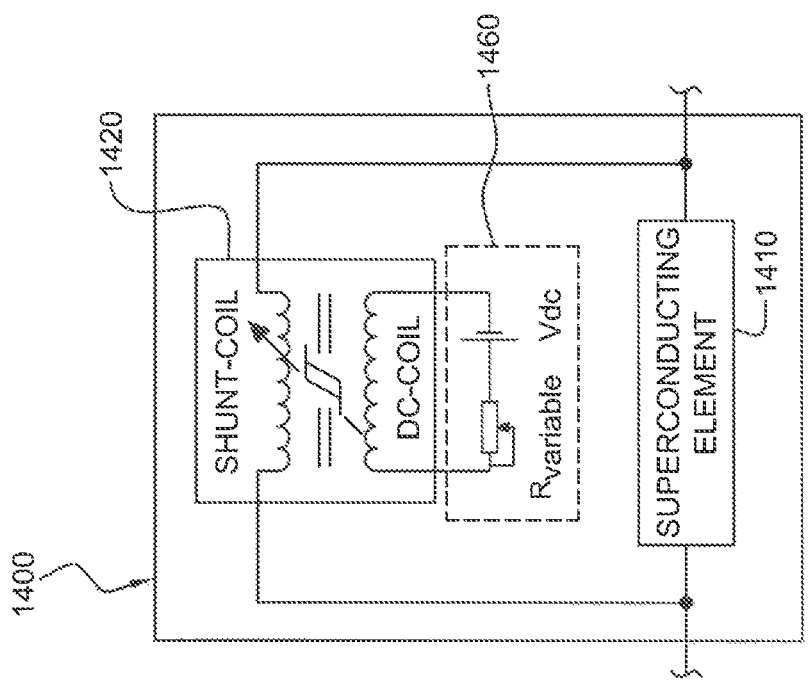
FIG. 14 is a schematic of another embodiment of a superconducting fault current-limiter, wherein a saturation controller is shown comprising a DC saturation controller, which controls saturation of the variable-impedance shunt electrically connected in parallel with the superconducting element, in accordance with an aspect of the present invention.

FIG. 14 depicts a further variation of a superconducting fault current-limiter 1400, in accordance with an aspect of the present invention. As shown, superconducting fault current-limiter 1400 includes a superconducting element 1410, and a variable-impedance shunt 1420 coupled in parallel therewith. In this embodiment, the variable-impedance shunt 1420 is controlled by a variable DC current flowing through a DC coil positioned to control saturation of a core, which is at least partially surrounded by the shunt coil. A saturation controller 1460 controls the amount of DC current fed through the DC coil, and thus controls saturation of the core. Although depicted within superconducting fault current-limiter 1400, controller 1460 would (in one implementation) be located outside of the vessel containing the superconducting fault current-limiter. Current or voltage sensing may be employed to sense presence of a fault current, and to control transitioning of the core of the variable-impedance shunt to and from saturated state, and thus, control transition of the impedance of the shunt from the first, high impedance to the second, low impedance, and back, as described herein.

The variable control current can be achieved in different ways, either, for example, by means of a variable-impedance, or by controlling the switching of a solid state output power supply. This saturatable topology will allow having a proportional control of the AC current flowing through the shunt coil. For simplicity, in FIG. 14 (as well as FIG. 16), a variable resistor is illustrated. When a fault current is present, the coils and core(s) are designed to have a high impedance, so that they do not saturate. At any moment during or after duration of the fault, the core can be saturated to switch the energy through the shunt, which will show lower impedance than the superconducting element at that point.

Figure 15:
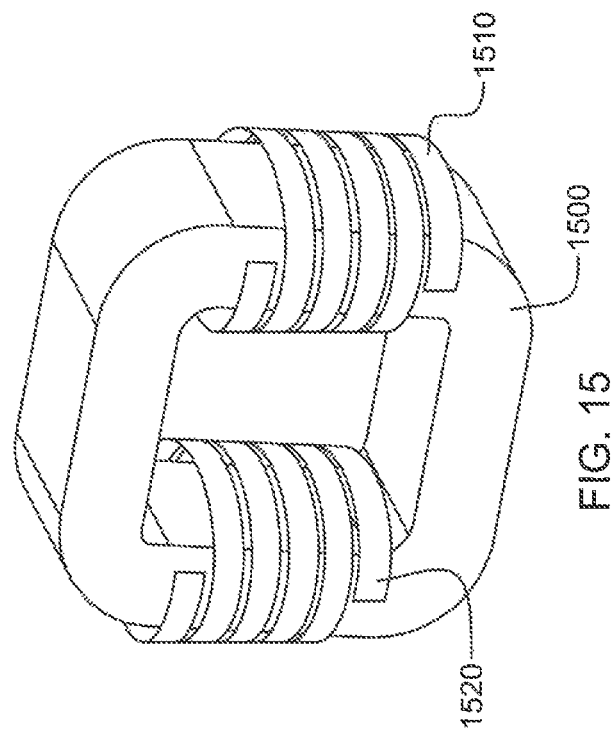
FIG. 15 depicts one embodiment of the variable-impedance shunt of FIG. 14, wherein both the shunt coil and the saturation coil partially surround a common, toroidal-shaped saturatable core, in accordance with an aspect of the present invention.

FIG. 15 illustrates one implementation of a fault current-limiter such as depicted in FIG. 14. In this implementation, a toroidal-shaped core is partially surrounded by a shunt coil 1510, and partially surrounded by DC coil 1520 of the variable-impedance shunt of the fault current-limiter. As explained further below, this represents one configuration of many possible configurations to control saturation of the core, and hence impedance through the shunt coil.

In order to control saturation, the variable-impedance shunt design should account for the increase in the magnetic field intensity due to the rise of current through the shunt coil from the fault current condition. This increase of current during the fault can also saturate the core by itself (as described above), that is, if as a result of the high current applied, the magnetic field intensity becomes large enough to saturate the core. Therefore, in order to have the ability to control saturation, the increase of current in the shunt coil during the fault condition should not dominate saturation of the coil. Thus, either the shunt coil should have a considerably smaller inductive value than the saturation coil and/or the current that controls the saturation should be comparable or higher than the fault current flowing through the shunt coil. As a consequence, the magnetic field intensity generated by the saturation coil should always be larger than the field intensity produced by the shunt coil, thereby allowing for control of the saturation process.

Figure 16:
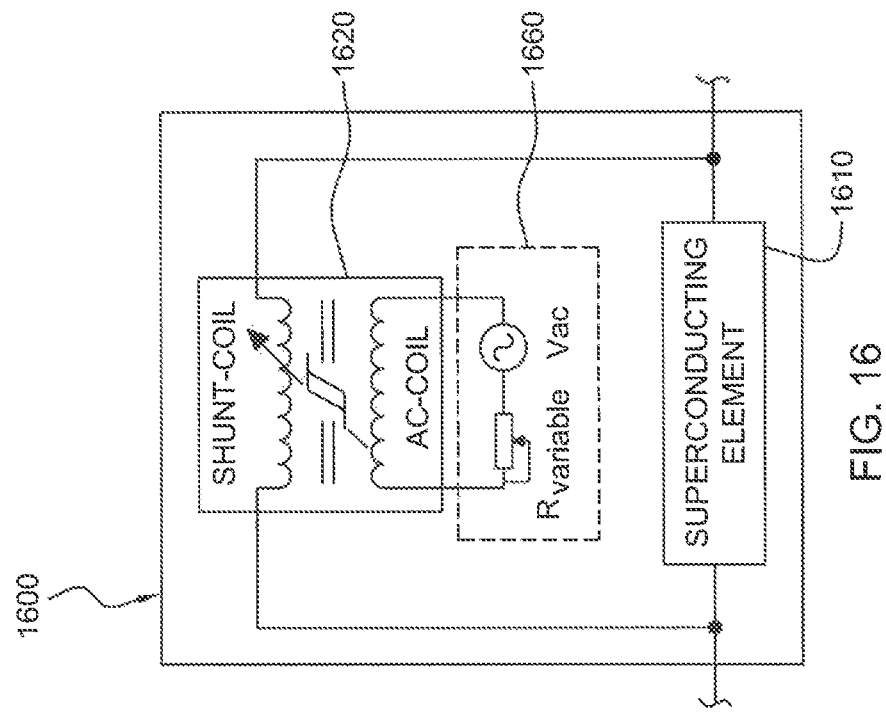
FIG. 16 is a schematic of an alternate embodiment of a variable-impedance shunt, wherein a saturation controller is shown comprising an AC saturation controller, which controls saturation of the variable-impedance shunt electrically connected in parallel with the superconducting element, in accordance with an aspect of the present invention.

As shown in FIG. 16, in one alternate embodiment, the superconducting fault current-limiter 1600 may include a variable-impedance shunt 1620, connected in parallel with the superconducting element 1610, and controlled via an AC saturation controller 1660. In this approach, the DC coil of the embodiment of FIG. 14 is substituted with an AC coil, and magnitude of the AC current is employed to deliberately saturate the core at a desired point in the fault recovery process.

Figure 17:
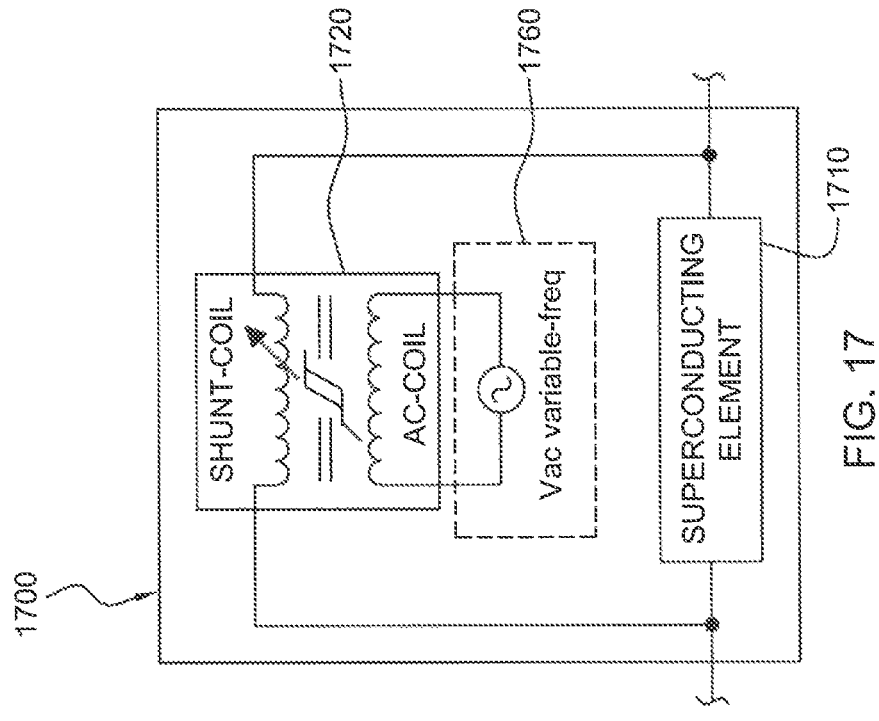
FIG. 17 is a schematic of a further embodiment of a superconducting fault current-limiter, wherein a saturation controller is shown comprising a frequency saturation controller, which controls saturation of the variable-impedance shunt electrically connected in parallel with the superconducting element, in accordance with an aspect of the present invention.

In addition to the above-described saturation phenomenon, permeability of certain ferromagnetic materials may be severely effected by frequency as well. Such materials present significantly lower permeability at higher frequencies than at other frequencies. This can be used as an AC saturation control, where the core can be saturated by increasing the magnitude of AC current applied to it in one of the sides (or along the length of the core), with an AC coil wound around it. In FIG. 17, the illustrated superconducting fault current-limiter 1700 includes a variable-impedance shunt 1720, electrically connected in parallel with superconducting element 1710, and controlled by a variable frequency controller 1760 to saturate the core at the desired point in the fault recovery process.

Note that any one of the designs of FIGS. 14-17 may be used in a fault current-limiter comprising two or more variable, saturatable reactances (variable-impedance shunts), as illustrated in FIG. 13, either with or without a parallel fixed reactance.

Saturation of the saturatable core(s) can also be accomplished by applying an indirect magnetic field produced by a coil that is not necessarily wound on the saturatable core partially surrounded by the shunt coil. All of the saturatable options discussed above can be used whether the saturation coil that initiates saturation is wound around the core (as described above) or external to the core, either with or without being wound around another core to produce the necessary magnetic field to initiate saturation of the variable-impedance shunt. This can also be achieved by applying the external magnetic field by means of any moving magnet or controllable external magnetic field. The cores can be straight or have a shape similar to a toroidal configuration. The saturatable coil and shunt coil can be placed in infinitely different combinations and positions and shapes to achieve the indirect triggering of saturation within the core surrounded by the shunt coil. Certain of these combinations are depicted in FIGS. 18A-18D, by way of example.

Figure 18A:
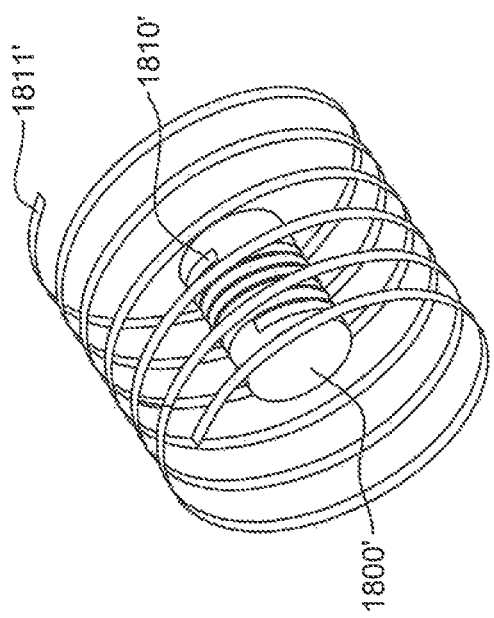
FIGS. 18A-18D depict alternate embodiments of a saturation control arrangement for indirect, magnetic field triggered saturation of the saturable core of the variable-impedance shunt to facilitate transitioning of the shunt from a first impedance to a second impedance during a recovery process of the superconducting element, in accordance with an aspect of the present invention.
Figure 18B:
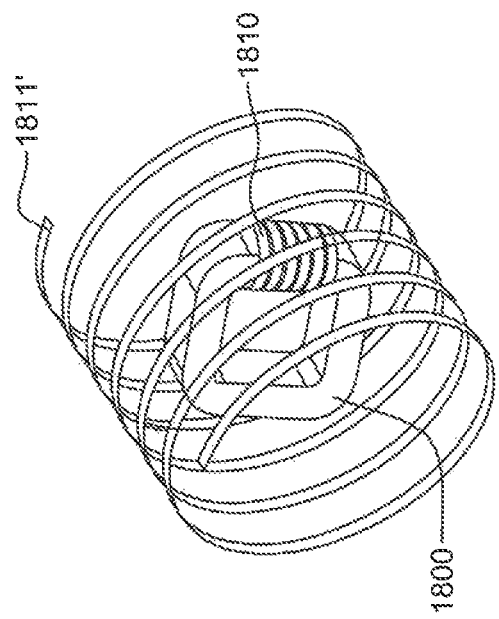
Figure 18C:
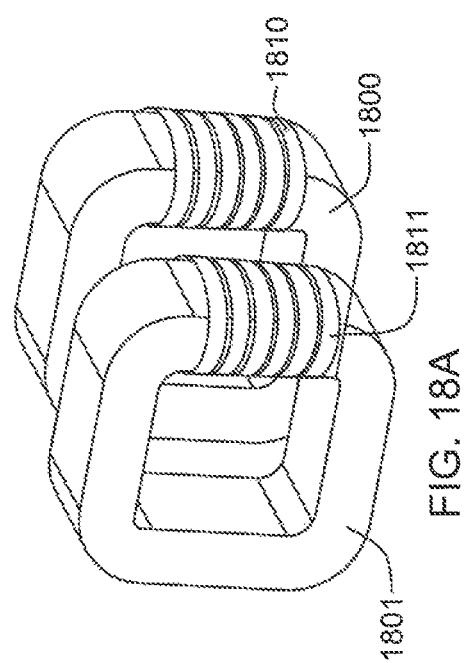
Figure 18D:
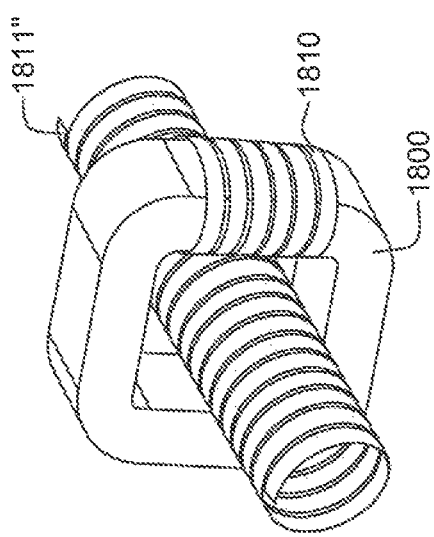

In FIG. 18A, a first core 1800 is partially surrounded by a shunt coil 1810, and a second core 1801 is partially surrounded by a saturation coil 1811, controlled as described above in connection with FIGS. 14-17. In FIG. 18B, a cylindrical-shaped core 1800' is partially surrounded by a shunt coil 1810', and saturation is indirectly controlled by establishing a magnetic field via a saturation coil 1811'. In FIG. 18C, toroidal-shaped core 1800 is partially surrounded by shunt coil 1810 and saturation is controlled by saturation coil 1811", which is shown passing through the toroidal-shaped core 1800. In FIG. 18D, toroidal-shaped core 1800 and shunt coil 1810 are enveloped by saturation coil 1811'.

Although the variable-impedance shunt is described herein as related to variable inductors, the variable-impedance discussed refers to any of three possible approaches by which impedance may be changed, that is, changing the resistive, inductive and/or capacitive values of the shunt. A large number of variable-impedance designs with resistive, inductive and capacitive components currently exist. Although this invention describes a few variable inductive alternatives, any variable resistive or capacitive impedance could be employed as well. The variable-impedance shunts could be placed in groups to match a given impedance slope, as described herein with saturated inductive loads. Therefore, the concepts presented refer to the use of any variable-impedance shunt in parallel with a superconducting element to be used (as described herein) in a superconducting fault current-limiter of any topology. As used herein, any variable capacitor, inductor or resistor design could be employed, which would enhance the dynamics of the devices presented. Also, laminated cores could be used with comparative thickness to the skin depth of the current frequency to avoid any current losses.

Additionally, one or more control aspects of the present invention can be included in an article of manufacture (e.g., one or more computer program products) having, for instance, computer usable media. The media has therein, for instance, computer readable program code means or logic (e.g., instructions, code, commands, etc.) to provide and facilitate the capabilities of the present invention. The article of manufacture can be included as a part of a computer system or sold separately.

One example of an article of manufacture or a computer program product incorporating one or more control aspects of the present invention includes, for instance, one or more computer-readable media to store computer readable program code means or logic thereon to provide and facilitate one or more aspects of the present invention. The medium can be an electronic, magnetic, optical, electromagnetic, infrared, or superconductor system (or apparatus or device) or a propagation medium. Examples of a computer readable medium include a superconductor or solid state memory, magnetic tape, a removable computer diskette, a random access memory (RAM), a read-only memory (ROM), a rigid magnetic disk and an optical disk. Examples of optical disks include compact disk-read only memory (CD-ROM), compact disk-read/write (CD-R/W) and DVD.

A sequence of program instructions or a logical assembly of one or more interrelated modules defined by one or more computer readable program code means or logic direct the performance of one or more control aspects of the present invention.

Although various embodiments are described above, these are only examples.

Further, a data processing system suitable for storing and/or executing program code is usable that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The capabilities of one or more control aspects of the present invention can be implemented in software, firmware, hardware, or some combination thereof. At least one program storage device readable by a machine embodying at least one program of instructions executable by the machine to perform the capabilities of the present invention can be provided.

The flow diagram depicted herein is just one example. There may be many variations to this diagram or the steps (or operations) described therein without departing from the spirit of the invention. For instance, certain steps may be performed in a differing order, or steps may be added, deleted, or modified. All of these variations are considered a part of the claimed invention.

Although embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A superconducting fault current-limiter comprising:
   a superconducting element, the superconducting element being configured to at least partially resistively or inductively limit a fault current passing therethrough;
   multiple, series connected, variable-impedance shunts electrically connected in parallel with the superconducting element, the multiple, series connected, variable-impedance shunts defining a variable impedance element connected in parallel with the superconducting element and configured to present a first impedance during a superconducting state of the superconducting element and a second impedance during a recovery transition of the superconducting element from a normal reisitive state to the superconducting state, the superconducting element transitioning from the superconducting state to the normal resistive state responsive to the fault current, and responsive thereto the variable impedance element transitions from the first impedance to the second impedance, the second impedance of the variable impedance element being a lower impedance than the first impedance and the transitioning of the variable impedance element from the first impedance to the second impedance facilitates current flow through the multiple, series connected, variable-impedance shunts during recovery transition of the superconducting element from normal resistive state to superconducting state, thereby facilitating recovery of the superconducting element under load;
   wherein each variable-impedance shunt of the multiple, series connected, variable-impedance shunts comprises a variable-impedance shunt coil at least partially surrounding a respective saturatable core disposed separate from the superconducting element, where impedance through the variable-impedance shunt coil transitions from the first impedance to the second impedance with saturation of the respective saturatable core; and
   wherein each variable-impedance shunt of the multiple, series connected, variable-impedance shunts further comprises a respective fixed impedance in parallel with the variable-impedance shunt coil, and wherein at least two saturatable cores of the multiple, series connected, variable-impedance shunts comprise a different saturation characteristic.

2. The superconducting fault current-limiter of claim 1, wherein the variable impedance element defined by the multiple, series connected, variable-impedance shunts subsequently transitions from the second impedance to the first impedance responsive to the superconducting element at least partially recovering from the limited fault current, the at least partially recovering comprising reaching a threshold current flow through the superconducting element during transition of the superconducting element from normal resistive state back to superconducting state.

3. A superconducting fault current-limiter comprising:
   a superconducting element, the superconducting element being configured to at least partially resistively or inductively limit a fault current passing therethrough;
   at least one variable-impedance shunt electrically coupled in parallel with the superconducting element, the at least one variable-impedance shunt being configured to present a first impedance during a superconducting state of the superconducting element and a second impedance during a recovery transition of the superconducting element from a normal resistive state to the superconducting state, the superconducting element transitioning from the superconducting state to the normal resistive state responsive to the fault current, and responsive thereto the at least one variable-impedance shunt transitions from the first impedance to the second impedance, the second impedance of the at least one variable-impedance shunt being a lower impedance than the first impedance and the transitioning of the at least one variable-impedance shunt from the first impedance to the second impedance facilitating current flow through the at least one variable-impedance shunt during recovery transition of the superconducting element from normal resistive state to superconducting state, thereby facilitating recovery of the superconducting element under load; and
   wherein the at least one variable-impedance shunt comprises at least one variable-impedance shunt coil configured to at least partially surround at least one core, and wherein the at least one variable-impedance shunt coil and the at least one core are co-axially aligned and are moveable relative to each other to facilitate varying impedance through the at least one variable-impedance shunt coil, and the superconducting fault current-limiter further comprises a controller for controlling position of the at least one core relative to the at least one variable-impedance shunt coil to facilitate transitioning of impedance of the at least one variable-impedance shunt between the first impedance and the second impedance.

4. The superconducting fault current-limiter of claim 3, wherein the at least one variable-impedance shunt comprises multiple variable-impedance shunt coils configured to at least partially surround multiple cores, each variable-impedance shunt coil being configured to at least partially surround a respective core of the multiple cores, and wherein the controller controls position of each core relative to its respective variable-impedance shunt coil to facilitate transitioning of impedance of the at least one variable-impedance shunt between the first impedance and the second impedance.

5. A superconducting fault current-limiter comprising:
a superconducting element, the superconducting element being configured to at least partially resistively or inductively limit a fault current passing therethrough;
at least one variable-impedance shunt electrically connected in parallel with the superconducting element, the at least one variable-impedance shunt comprising a variable impedance element connected in parallel with the superconducting element and configured to present a first impedance during a superconducting state of the superconducting element and a second impedance during a recovery transition of the superconducting element from a normal resistive state to the superconducting state, the superconducting element transitioning from the superconducting state to the normal resistive state responsive to the fault current, and responsive thereto the variable impedance element of the at least one variable-impedance shunt transitions from the first impedance to the second impedance, the second impedance of the variable impedance element of the at least one variable-impedance shunt being a lower impedance than the first impedance and the transitioning of the variable impedance element of the at least one variable-impedance shunt from the first impedance to the second impedance facilitates current flow through the at least one variable-impedance shunt during recovery transition of the superconducting element from normal resistive state to superconducting state, thereby facilitating recovery of the superconducting element under load;
wherein the variable impedance element of the at least one variable-impedance shunt comprises at least one variable-impedance shunt coil at least partially surrounding at least one saturatable core that is separate from the superconducting element, wherein impedance through the at least one variable-impedance shunt coil transitions from the first impedance to the second impedance with saturation of the at least one saturatable core; and
further comprising a saturation controller for actively controlling saturation of the at least one saturatable core at least partially surrounded by the at least one variable-impedance shunt coil to facilitate transition of the variable impedance element of the at least one variable-impedance shunt from the first impedance to the second impedance.

6. The superconducting fault current-limiter of claim 5, wherein the saturation controller comprises one of a DC saturation controller, an AC saturation controller or a frequency saturation controller.

7. The superconducting fault current-limiter of claim 5, further comprising a plurality of superconducting elements connected in series and configured to resistively or inductively limit the fault current, wherein each superconducting element comprises multiple superconductor segments coupled in parallel.

8. The superconducting fault current-limiter of claim 5, wherein the saturation controller comprises one of a permanent magnet disposed to selectively, magnetically couple to the at least one saturatable core to control saturation of the at least one saturatable core, or a saturation coil disposed to magnetically couple, when current passes therethrough, to the at least one saturatable core to control saturation of the at least one saturatable core and thereby facilitate transitioning of the variable impedance element of the at least one variable-impedance shunt from the first impedance to the second impedance.

9. The superconducting fault current-limiter of claim 8, wherein the saturation controller comprises the saturation coil, and the saturation coil at least partially surrounds the at least one saturatable core.

10. The superconducting fault current-limiter of claim 8, wherein the saturation controller comprises the saturation coil, and the saturation coil is disposed adjacent to, but not wound around, the at least one saturatable core.

11. The superconducting fault current-limiter of claim 10, wherein the saturation coil one of surrounds the at least one variable-impedance shunt coil, which at least partially surrounds the at least one saturatable core, or at least partially passes through the at least one saturatable core.

* * * * *